US012652656B2

(12) United States Patent
Wang et al.

(10) Patent No.: US 12,652,656 B2
(45) Date of Patent: Jun. 9, 2026

(54) COMMUNICATION METHOD, BASE STATION, USER EQUIPMENT AND STORAGE MEDIUM

(71) Applicant: SAMSUNG ELECTRONICS CO., LTD., Suwon-si (KR)

(72) Inventors: Shoufeng Wang, Beijing (CN); Junyi Yu, Beijing (CN); Nan Cao, Beijing (CN); Xiaohui Yang, Beijing (CN); Xiao Han, Beijing (CN); Haoqiang Ruan, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 18/308,832

(22) Filed: Apr. 28, 2023

(65) Prior Publication Data

US 2023/0403685 A1     Dec. 14, 2023

Related U.S. Application Data

(63) Continuation of application No. PCT/KR2023/003816, filed on Mar. 22, 2023.

(30) Foreign Application Priority Data

Jun. 14, 2022     (CN) .......................... 202210674664.0

(51) Int. Cl.
　　*H04W 72/04*　　　　(2023.01)
　　*H04L 5/00*　　　　　(2006.01)
　　　　　　　(Continued)

(52) U.S. Cl.
　　CPC ......... *H04W 72/044* (2013.01); *H04L 5/0035* (2013.01); *H04W 52/365* (2013.01); *H04W 52/40* (2013.01)

(58) Field of Classification Search
　　CPC .... H04L 5/001; H04L 5/0035; H04W 52/146; H04W 52/34; H04W 52/365; H04W 52/367; H04W 52/40; H04W 72/044
　　See application file for complete search history.

(56) References Cited

U.S. PATENT DOCUMENTS

| 8,842,613 | B2 | 9/2014 | Zhang et al. |
| 9,749,970 | B2 | 8/2017 | Vajapeyam et al. |
| (Continued) |

FOREIGN PATENT DOCUMENTS

| CN | 108377552 A | 8/2018 |
| CN | 110324886 | 10/2019 |
| (Continued) |

OTHER PUBLICATIONS

Search Report and Written Opinion dated Jun. 29, 2023 issued in International Patent Application No. PCT/KR2023/003816.

*Primary Examiner* — Phuc H Tran
(74) *Attorney, Agent, or Firm* — NIXON & VANDERHYE P.C.

(57) ABSTRACT

The disclosure provides a communication method, a base station, a user equipment, and a storage medium in a communication system supporting a carrier aggregation (CA). The method comprises identifying ratio information for a plurality of carriers for a user equipment (UE) from at least one candidate ratio information based on a total carrier transmission capacity of the plurality of carriers. The method comprises determining a transmit power for each carrier based on the target power allocation ratio information. The method comprises receiving, from the UE, uplink signals according to the transmit power for each carrier. The ratio information for the plurality of carriers includes a power allocation ratio for each carrier. The total carrier transmission capacity of the plurality of carriers comprises a sum of transport block sizes of individual carriers in the (Continued)

```
        carrier aggregation situation          input parameters for
            estimation output                   power allocation
                    |
                    v
(1)   estimate primary carrier control plane power
                    |
                    v
(2)        calculate user plane power value
                    |
                    v
(3)   dynamically generate the power allocation for
                  each carrier
                    |
                    v
            the end-of-iteration          No
            condition is satisfied
                    | Yes
                    v
(4)    update primary carrier power allocation
       result and output power allocation result
                    |
                    v
         intelligent power allocation result
``` plurality of carriers. The above method performed by the base station or UE can be performed using an artificial intelligence model.

18 Claims, 19 Drawing Sheets

(51) Int. Cl.

| | | |
|---|---|---|
| *H04W 52/36* | (2009.01) | |
| *H04W 52/40* | (2009.01) | |
| *H04W 72/044* | (2023.01) | |

(56) References Cited

U.S. PATENT DOCUMENTS

| | | | |
|---|---|---|---|
| 9,763,246 | B2 | 9/2017 | Chen et al. |
| 9,769,773 | B1 | 9/2017 | Park et al. |
| 10,667,241 | B2 | 5/2020 | Sebire |
| 10,893,487 | B2 | 1/2021 | Wang et al. |
| 11,540,235 | B2 | 12/2022 | Shin et al. |
| 2010/0157895 | A1* | 6/2010 | Pani ..................... H04W 72/21 |
| | | | 370/328 |

| | | | |
|---|---|---|---|
| 2012/0201211 | A1* | 8/2012 | Wong ................. H04W 52/367 |
| | | | 370/329 |
| 2013/0242729 | A1 | 9/2013 | Chen et al. |
| 2017/0070965 | A1* | 3/2017 | Marinier .......... H04W 72/1268 |
| 2019/0261359 | A1 | 8/2019 | Wang et al. |
| 2020/0128493 | A1 | 4/2020 | Takaoka et al. |
| 2020/0221396 | A1 | 7/2020 | Wang et al. |
| 2020/0305201 | A1 | 9/2020 | Lei et al. |
| 2020/0351771 | A1 | 11/2020 | Geekie et al. |
| 2020/0351880 | A1 | 11/2020 | Tong et al. |
| 2020/0374808 | A1 | 11/2020 | Zhang et al. |
| 2020/0403761 | A1 | 12/2020 | Nguyen |
| 2021/0022087 | A1 | 1/2021 | Saber et al. |
| 2023/0397211 | A1* | 12/2023 | Takeda ............... H04W 52/346 |

FOREIGN PATENT DOCUMENTS

| | | |
|---|---|---|
| CN | 114339975 | 4/2022 |
| EP | 3528573 A1 | 8/2019 |
| EP | 3753166 B1 | 7/2021 |
| KR | 10-2021-0015562 | 2/2021 |
| WO | 2017024432 A1 | 2/2017 |
| WO | 2019159390 A1 | 8/2019 |
| WO | 2019160474 A1 | 8/2019 |
| WO | 2020223520 A1 | 11/2020 |
| WO | 2022/038404 | 2/2022 |

\* cited by examiner

COMMUNICATION METHOD, BASE STATION, USER EQUIPMENT AND STORAGE MEDIUM

CROSS-REFERENCE TO RELATED APPLICATIONS

This application is a continuation of International Application No. PCT/KR2023/003816 designating the United States, filed on Mar. 22, 2023, in the Korean Intellectual Property Receiving Office and claiming priority to Chinese Patent Application No. 202210674664.0, filed on Jun. 14, 2022, in the Chinese Patent Office, the disclosures of which are incorporated by reference herein in their entireties.

BACKGROUND

Field

The disclosure relates to the field of communication technology, and for example, the disclosure relates to a communication method, a base station, a user equipment (UE) and a storage medium.

Description of Related Art

In order to meet the increased demand for wireless data communication services since the deployment of 4G communication systems, efforts have been made to develop improved 5G or pre-5G communication systems. Therefore, 5G or pre-5G communication systems are also referred to as "Beyond 4G networks" or "post-LTE (Long Term Evolution) systems".

5G communication systems are implemented in higher frequency (millimeter wave, mmWave) bands, such as the 60 GHz band, to achieve higher data rates. In order to reduce the propagation loss of radio waves and increase the transmission distance, beamforming, massive Multiple Input Multiple Output (MIMO), Full Dimension-MIMO (1-D-MIMO), array antennas, simulated beamforming, large-scale antenna and other technologies in 5G communication systems are discussed.

In addition, in 5G communication systems, development for system network improvement is under way based on advanced small cells, cloud Radio Access Networks (RANs), ultra-dense networks, device-to-device (D2D) communication, wireless backhaul, mobile network, cooperative communication, Coordinated Multi-Points (CoMP), reception-end interference cancellation and the like In the 5G system, Hybrid FSK (Frequency-Shift Keying) and QAM Modulation (Quadrature Amplitude Modulation, FQAM) and sliding window superposition coding (SWSC) as an Adaptive Coding and Modulation (ACM), and Filter Bank Multicarrier (FBMC), Non-Orthogonal Multiple Access (NOMA), and Sparse Code Multiple Access (SCMA) as an advanced access technology have been developed.

In the existing scheme, for Uplink (UL) power allocation with Carrier Aggregation (CA) technology, the base station decides which carriers to use for the scheduling and allocates the UE's uplink power evenly among these carriers participating in the scheduling. However, such a power allocation method may result in the actual power required by one or some carriers of the UE being lower than the allocated power, thus resulting in power waste.

SUMMARY

Embodiments of the disclosure are capable of reducing the power waste of the UE.

According to an example embodiment of the disclosure, there is provided a method performed by a base station in a communication system, the method including: determining a target power allocation ratio for each carrier; and determining, according to the target power allocation ratio, a transmit power corresponding to each carrier.

According to an example embodiment of the disclosure, there is provided a method performed by a user equipment (UE) in a communication system, the method including: reporting a Power Headroom Report (PHR) to the base station enabling the base station to determine a target power allocation ratio for each carrier of the UE, and determining, according to the target power allocation ratio, a transmit power respectively corresponding to each carrier.

According to an example embodiment of the disclosure, there is provided a base station, the base station including:
  a transceiver configured to transmit and receive signals; and a controller coupled to the transceiver and configured to perform operations performed by the base station as provided above.

According to an example embodiment of the disclosure, there is provided a UE, the UE including a transceiver configured to transmit and receive signals; and a controller coupled to the transceiver and configured to perform operations performed by the UE provided above.

According to an example embodiment of the disclosure, there is provided a non-transitory computer-readable storage medium having program instructions stored thereon, the instructions, when executed by the processor, cause the base station to perform the operations of the base station above.

According to an example embodiment of the disclosure, there is provided a non-transitory computer-readable storage medium having program instructions stored thereon, the instructions, when executed by the processor, cause the UE to perform the operations of the UE above.

According to an example embodiment of the disclosure, there is provided computer program product including computer programs, the computer programs, when executed by the processor, cause the base station to perform the operations of the base station above.

According to an example embodiment of the disclosure, there is provided a computer program product including computer programs, the computer programs when executed by the processor cause the UE to perform operations of the UE above.

The communication method, the base station, the user equipment and the storage medium provided by various example embodiments of the disclosure enable setting different transmit powers for individual carriers having different capabilities by determining a target power allocation ratio for each carrier and determining a transmit power respectively corresponding to each carrier according to the target power allocation ratio, to save power consumption of the UE as much as possible, thereby extending the UE operation time.

According to embodiments, a device of a base station in a communication system supporting a carrier aggregation (CA). The device comprises at least one transceiver and at least one processor coupled to the at least one transceiver. The at least one processor is configured to identify ratio information for a plurality of carriers for a user equipment (UE) from at least one candidate ratio information based on a total carrier transmission capacity of the plurality of carriers. The at least one processor is configured to determine a transmit power for each carrier based on the target power allocation ratio information. The at least one processor is configured to obtain, from the UE, uplink signals according to the transmit power for each carrier. The ratio information for the plurality of carriers includes a power allocation ratio for each carrier. The total carrier transmission capacity of the plurality of carriers comprises transport block sizes of individual carriers in the plurality of carriers.

According to embodiments, a method performed by a base station in a communication system supporting a carrier aggregation (CA). The method comprises identifying ratio information for a plurality of carriers for a user equipment (UE) from at least one candidate ratio information based on a total carrier transmission capacity of the plurality of carriers. The method comprises determining a transmit power for each carrier based on the target power allocation ratio information. The method comprises receiving, from the UE, uplink signals according to the transmit power for each carrier. The ratio information for the plurality of carriers includes a power allocation ratio for each carrier. The total carrier transmission capacity of the plurality of carriers comprises transport block sizes of individual carriers in the plurality of carriers.

According to embodiments, a non-transitory computer-readable storage medium having stored thereon program instructions, the instructions, when executed by a processor, perform operations including identifying ratio information for a plurality of carriers for a user equipment (UE) from at least one candidate ratio information based on a total carrier transmission capacity of the plurality of carriers. The operations includes determining a transmit power for each carrier based on the target power allocation ratio information. The operations includes receiving, from the UE, uplink signals according to the transmit power for each carrier. The ratio information for the plurality of carriers includes a power allocation ratio for each carrier. The total carrier transmission capacity of the plurality of carriers comprises transport block sizes of individual carriers in the plurality of carriers.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
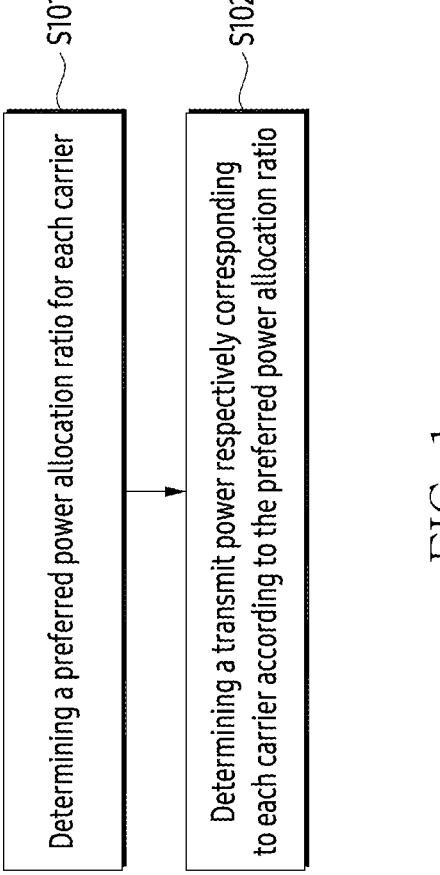
FIG. 1 is a flowchart illustrating an example method performed by a base station according to various embodiments.

Embodiments of the disclosure are described in greater detail below in connection with the accompanying drawings. It should be understood that the various example embodiments set forth below in conjunction with the accompanying drawings are merely example descriptions for the purpose of explaining the various embodiments and are no limitations to the disclosure.

It will be understood by those skilled in the art that the singular forms "one", "a" and "the" as used herein may also include the plural forms, unless otherwise stated. It should be further understood that the terms "comprising" and "including" used in various embodiments disclosure may refer to corresponding features may be implemented as presented features, information, data, steps, operations, elements and/or components, but do not exclude that corresponding features may be implemented as other features, information, data, steps, operations, elements, components, and/or combinations thereof, and so on supported in the art. It should be understood that, when an element is "connected to" or "coupled to" to another element, this element may be directly connected to or coupled to the another element, or this element may be connected to the another element through an intermediate element. In addition, the "connection" or "coupling" as used herein may include wireless connection or wireless coupling. The term "and/or" as used herein indicates at least one of the items defined by the term, for example, "A and/or B" may be implemented as "A", or as "B", or as "A and B".

In order to make the disclosure clearer, the following will be described in greater detail in conjunction with the accompanying drawings.

In the existing conventional uplink power allocation scheme for carrier aggregation, the base station decides which carriers to use to participate in the scheduling and equally allocates the uplink power of the UE to these carriers participating in the scheduling. The deficiencies of this uplink power allocation approach are mainly as follows:

(1) Inflexibility: the existing scheme equally allocates the transmit power for each carrier participating in the scheduling, which leads to the waste of UE power and reduces the peak rate of UE.

(2) Weak adaptability: the power allocation period is too long relative to the scheduling period, and it cannot adapt to the influence of the Modulation and Coding Scheme (MCS, also referred to as modulation mode) fluctuations on the transmission rate due to the dynamic changes of the channel during the power allocation period, resulting in low transmission efficiency.

Example reasons for the above deficiencies are as follows.

(1) inflexible power allocation mechanism: there are only a few power allocation options and a single power allocation method, which causes the power waste and reduces the transmission efficiency.

For example, the linear equalization of the transmit power based on the number of carriers participating in the scheduling only considers the case where each carrier has the same condition, e.g., the transmit power allocated to each carrier is of the same value. However, the inventors of the present application have found that the actual power required for each carrier may be different. When the actual required transmit power of a carrier is lower than the allocated power value, the power will be wasted; when the required transmit power of a carrier is higher than the allocated power value, the peak rate of the UE will be reduced. The optional power allocation scheme of this power allocation mechanism is too limited and cannot fully utilize the full power of the UE.

(2) Weak adaptability: the relevant parameters for calculating the power allocation result adopt instantaneous values, therefore having a serious impact on the transmission efficiency at other moments in the power allocation period, which further aggravating the power waste.

For example, the calculation of power allocation results is based on the instantaneous values, which can involve, for example, the number of symbols, MCS, number of layers and other parameters used. The power allocation result is constant during one PHR reporting period (the duration may contain multiple time units, e.g., 100 time slots, but is not limited thereto). However, parameters such as number of symbols, MCS, number of layers, etc. may change and update within each time unit. Therefore, the power allocation result calculated by the instantaneous value cannot accommodate the power demand that changes at any time during the whole PHR reporting period.

In view of the at least one of the above deficiencies or areas that need to be improved existing in the related art, the disclosure provides a power allocation scheme that can save the power consumption of the UE as much as possible by dynamically setting different transmit powers for each carrier with different capabilities, thus extending the UE operation time while keeping the transmission rate of the UE unaffected.

The embodiments of the disclosure and their attendant advantages are described below through the description of several example embodiments. It should be noted that the following embodiments can be cross-referenced, borrowed or combined with each other, and the descriptions of the same terms, similar features and similar implementation operations, etc. in different embodiments will not be repeated.

A method performed by a base station in a communication system is provided in an embodiment, as shown in FIG. 1, the method including:

Operation S101: determining the target power allocation ratio for each carrier (Component Carrier, CC, which can also be simply deemed as a cell).

Embodiments can apply to the power allocation of each uplink carrier in an uplink carrier aggregation scenario. When the amount of data services to be transmitted by the UE is greater than the networks predefined determination threshold for initiating carrier aggregation and the UE supports carrier aggregation technology, the network enables carrier aggregation for the UE and activates each carrier for carrier aggregation. The UE starts to report the power headroom report (PHR) to the base station periodically, which is used for the base station to update the maximum transmit power (max power) information of the UE.

Based on the PHR report, the base station may make a decision on the transmit power for an actual transmission to be allocated to each carrier for a given future period time.

In an embodiment, the given future period may refer to a PHR reporting period, and may also be referred to as PHR interval period, power allocation period, or power control period, etc., but is not limited to these names and may be other names as well. The transmit power may also be referred to as transmission power, uplink power, or uplink transmit power, etc., or may also be referred to simply as power.

In an embodiment, at the beginning of each PHR reporting period, the base station decides the target power allocation ratio for each carrier scheduling in this PHR reporting period.

Wherein the power allocation ratio may refer to the percentage of the power allocated respectively to each carrier in the carrier aggregation to the total power, and the sum of the ratio values respectively corresponding to all carriers can be 1, e.g., $$\sum_{i=0}^{N-1} R_i = 1, R_i \geq 0,$$

wherein $R_i$ denotes the ratio value allocated to $CC_i$; N denotes the total number of carriers. Further, the target power allocation ratio refers to the preferred power allocation ratio scheme determined to maximize and/or improve the overall capability of all carriers of the carrier aggregation.

For example, the preferred target power allocation ratio for each carrier may be determined according to the carrier capability of each carrier. One skilled in the art may set information for measuring the carrier capability of each carrier, such as the carrier throughput or data transmission rate, according to the actual situation, and an embodiment is not limited herein.

Operation S102: determining the transmit power respectively corresponding to each carrier according to the target power allocation ratio.

Based on the determined target power allocation ratio, different percentages of power can be allocated to each carrier with different capabilities.

For example, according to the determined target power allocation ratio and the total UE uplink power, the transmit power respectively corresponding to each carrier is obtained. For example, the ratio value corresponding to each carrier in the target power allocation ratio is multiplied by the total UE uplink power, but is not limited herein.

The method performed by the base station provided by an embodiment can achieve setting different transmit power for each carrier with different capacities to save the power consumption of the UE as much as possible and improve the transmission efficiency so as to extend the UE operation time, and the user can then get a better experience by enjoying the high transmission rate service for a longer period of time.

In an embodiment, a feasible implementation is provided for operation S101, for example, it may include the operations of:

Operation S1011 (not shown): determining the carrier transmission capacity respectively corresponding to at least one candidate power allocation ratio for each carrier.

Operation S1012 (not shown): determining a target power allocation ratio from among the at least one candidate power allocation ratio according to the carrier transmission capacity respectively corresponding to the at least one candidate power allocation ratio.

In an embodiment, the base station may assume that the carriers under different power allocation schemes (e.g., corresponding to different power allocation ratios) will be involved in the scheduling, estimate the carrier capability corresponding to each power allocation scheme, and then determine a superior power allocation scheme from among the different power allocation schemes, which is used to calculate the transmit power respectively corresponding to each carrier. That is, the candidate power allocation ratio refers to one or more power allocation ratio schemes used to select the candidate of the target power allocation ratio.

In an embodiment, the carrier capability corresponding to each candidate power allocation ratio may be determined according to the throughput or data transmission rate resulting from each candidate power allocation ratio, and for example, the carrier transmission capacity (which may also be referred to as transmission capacity or capacity) corresponding to each candidate power allocation ratio may be calculated for each candidate power allocation ratio. The carrier transmission capacity may be embodied in the Transport Block Size (TBS) of the carrier, but is not limited thereto. For ease of description, various example embodiments below may be presented as if the carrier transmission capacity is the TBS of the carrier.

In an embodiment, the carrier transmission capacity may refer to the transmission capacity of each carrier corresponding to each candidate power allocation ratio, or may refer to the total transmission capacity of all carriers corresponding to each candidate power allocation ratio, but is not limited thereto. It is understood that any embodiment being capable of reflecting the carrier capability corresponding to each candidate power allocation ratio can be applied to the present disclosure, and therefore shall be included in the scope of protection of the present disclosure.

As an example, the carrier transmission capacity respectively corresponding to at least one candidate power allocation ratio may be the total carrier transmission capacity respectively corresponding to at least one candidate power allocation ratio, then in operation S1012, the candidate power allocation ratio corresponding to the maximum total carrier transmission capacity among at least one candidate power allocation ratio may be determined as the target power allocation ratio.

Figure 2:
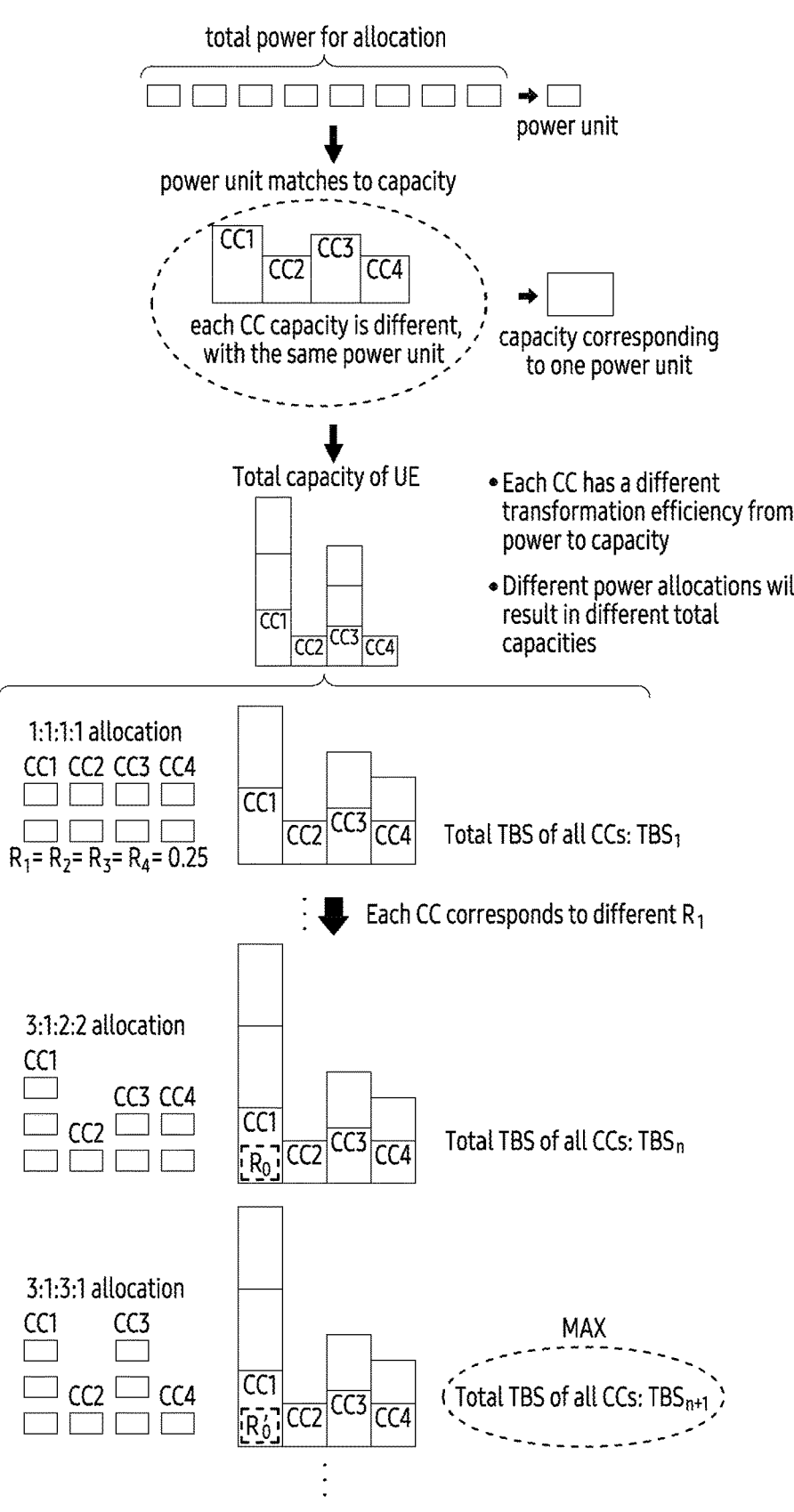
FIG. 2 is a diagram illustrating an example of determining one target power allocation ratio from among multiple candidate power allocation ratios according to various embodiments.

Taking an example that the carrier transmission capacity is the TBS of the carrier, an example of determining one target power allocation ratio from among a plurality of candidate power allocation ratios is illustrated by FIG. 2. Referring to FIG. 2, it can be seen that each CC has a different conversion efficiency from transmit power to transmission capacity, e.g., the capacity of each CC with the same power unit is also different, so different power allocation ratios will result in different total carrier transmission capacities. This example determines the power allocation ratio corresponding to the maximum total TBS of the total TBS of all CCs. In the example given in FIG. 2, the power is allocated according to 1:1:1:1 to obtain the total TBS of all CCs as $TBS_1$; the power is allocated according to 3:1:2:2 to obtain the total TBS of all CCs as $TBS_n$; the power is allocated according to 3:1:3:1 to obtain the total TBS of all CCs as $TBS_{n+1}$; the other power allocation ratios are similar and will not be repeated. In this example, it is assumed that $TBS_{n+1}$ is the maximum of all total TBS values (e.g., the maximum total carrier transmission capacity in the total carrier transmission capacities of all candidate power allocation ratios), so the power allocation ratio $R_0=0.375$, $R_1=0.125$, $R_2=0.375$, $R_3=0.125$ (corresponding to 3:1:3:1) can be determined as the target power allocation ratios.

In addition, as can be seen from FIG. 2, the power allocation method provided according to various embodiments can also include a power equalization scheme (e.g., when the target power allocation ratio is equal), as well as a scheme that also includes selecting a different number of carriers participating in the scheduling (e.g., when R=0 corresponding to a certain CC in the target power allocation ratio). In other words, the power allocation method provided by an embodiment contains more selectable schemes with higher flexibility and applicability.

In an embodiment, in operation S1011, the transmission capacity of each carrier respectively corresponding to at least one candidate power allocation ratio can be determined first, and the total transmission capacity of the carrier respectively corresponding to at least one candidate power allocation ratio can be determined according to the transmission capacity of each carrier respectively corresponding to at least one candidate power allocation ratio, and then in operation S1012, the candidate power allocation ratio corresponding to the maximum total carrier transmission capacity among the at least one candidate power allocation ratio is determined as the target power allocation ratio.

Continuing with the example that the carrier transmission capacity is the TBS of the carrier, then the maximum total TBS can be expressed as the following Equation I.

$$F = \text{arg. max}\left(\sum_{i=0}^{N-1} TBS_i\right) \qquad \text{Equation I}$$

Wherein $TBS_i$ denotes the transmission capacity of $CC_i$ and the value of $TBS_i$ is related to the power allocation ratio (e.g., it depends on the corresponding power allocation ratio and can also be interpreted as being influenced by the power allocation ratio $R_i$), i.e., $$\sum_{i=0}^{N-1} TBS_i$$

denotes the total TBS corresponding to one candidate power allocation ratio; arg·max(•) denotes the determination of the maximum value in multiple total TBSs; N denotes the total number of CCs. After the maximum total TBS is determined, the candidate power allocation ratio corresponding to the maximum total TBS can then be determined as a target power allocation ratio for allocating a suitable ratio of power to each carrier with different capabilities.

In an embodiment, a feasible implementation is provided for determining the carrier transmission capacity corresponding to any candidate power allocation ratio for each carrier, for example, it may include operations including: determining the estimated transmission capacity parameter of each carrier corresponding to any of candidate power allocation ratios and/or the resource Block (RB) allocated for each carrier corresponding to any of the candidate power allocation ratios; determining the carrier transmission capacity corresponding to any of the candidate power allocation ratios according to the estimated transmission capacity parameter and/or the resource block.

Similarly, an implementation may include: for the any candidate power allocation ratio, the transmission capacity of each carrier corresponding to the any candidate power allocation ratio may be determined according to the estimated transmission capacity parameter of each carrier and/or the resource block allocated to each carrier, and then the corresponding total transmission capacity of the carrier is determined.

As an example, taking the example that the carrier transmission capacity is the TBS of the carrier, it may be that the TBS corresponding to each CC is calculated by Equation II as follows for one candidate power allocation ratio, based on the estimated transmission capacity parameter of each CC and the RB allocated to each CC, on the basis of Equation I above.

$$TBS_i = f_{TBS}(CC_i TBS \text{ parameters}, RB_i) \qquad \text{Equation II}$$

Wherein $CC_i$ TBS parameters denotes the estimated TBS (transmission capacity) parameter of $CC_i$; $RB_i$ denotes the resource block allocated for $CC_i$ (which may be indicated as the number of the resource, but not limited thereto); and the value of the $CC_i$ TBS parameters and $RB_i$ are associated with power allocation ratio, e.g., $CC_i$ TBS parameters denotes an estimated TBS parameter of $CC_i$ corresponding to a candidate power allocation ratio where the power allocation ratio affects the channel conditions in the TBS parameter, $RB_i$ denotes the resource block allocated for $CC_i$ corresponding to one candidate power allocation ratio; $f_{TBS}(•)$ denotes that the $CC_i$ TBS parameters and $RB_i$ are processed accordingly to obtain the $TBS_i$ (Transmission capacity) corresponding to the $CC_i$ of the corresponding candidate power allocation ratio.

Another implementation may include: for any of the candidate power allocation ratios, it may be that the total carrier transmission capacity corresponding to any of the candidate power allocation ratios is determined directly according to the estimated transmission capacity parameter of each carrier and/or the resource block allocated for each carrier. For example, the estimated transmission capacity parameters and/or resource blocks corresponding to all carriers are aggregated to calculate the total carrier transmission capacity. For details, please refer to the illustration above and will not be repeated here.

In an embodiment, the transmission capacity parameters are parameters related to the configuration of the UE, service load or scheduling and channel conditions, such as, but not limited to, the number of symbols, MCS, number of layers, etc. used for service transmission. These parameters have a short change period, e.g., they may change every time unit.

For various embodiments, the reason for using estimated transmission capacity parameters is that the parameters used to determine the CC transmission capacity are usually not constant but change in real time during a PHR reporting period. Therefore, an estimation of data variation (which can also be referred to as a situation estimation) can be performed to obtain an estimated transmission capacity parameter which is used to represent the trend of variation within one PHR reporting period thereof.

Various embodiments provide a feasible implementation in which estimated transmission capacity parameters of each carrier corresponding to any candidate power allocation ratio can be determined according to a historical transmission capacity parameter of each carrier. Wherein, the estimated transmission capacity parameter includes, but is not limited to, at least one of the following: estimated number of symbols, estimated signal value, estimated interference value, estimated SINR, estimated MCS, estimated number of layers, etc. The historical transmission capacity parameter may be a transmission capacity parameter at one or more historical moments (which may correspond to small time granularities, e.g., it may be a historical transmission capacity parameter at the level of one or more time units (e.g., time slots)). The historical transmission capacity parameters include, but are not limited to, at least one of the following: number of historical symbols, historical signal value, historical interference value, historical SINR, historical MCS, and number of historical layers, etc. One skilled in the art may set the desired estimated transmission capacity parameters, as well as the historical transmission capacity parameters used to calculate the desired estimated transmission capacity parameters and their calculation manners, according to the actual situation, and various embodiments are not limited herein.

As an example, the desired estimated transmission capacity parameters in an embodiment include estimated MCS, and the estimated MCS can be calculated based on the historical transmission capacity parameters and calculation manners as shown in Equations III to VII as follows.

$$MCS_i' = f_{MCS}(SINR_i', sym_i', Mod) \qquad \text{Equation III}$$

$$sym_i' = f_{SA\_1}(\text{his\_sym}) \qquad \text{Equation IV}$$

$$SINR_i' = [S_i' + f_{offset}(R_i \cdot P_{Total})]/(I_i' + N) \qquad \text{Equation V}$$

$$S_i' = f_{SA\_2}(\text{his\_S}) \qquad \text{Equation VI}$$

$$I_i' = f_{SA\_3}(\text{his\_I}) \qquad \text{Equation VII}$$

Figure 3:
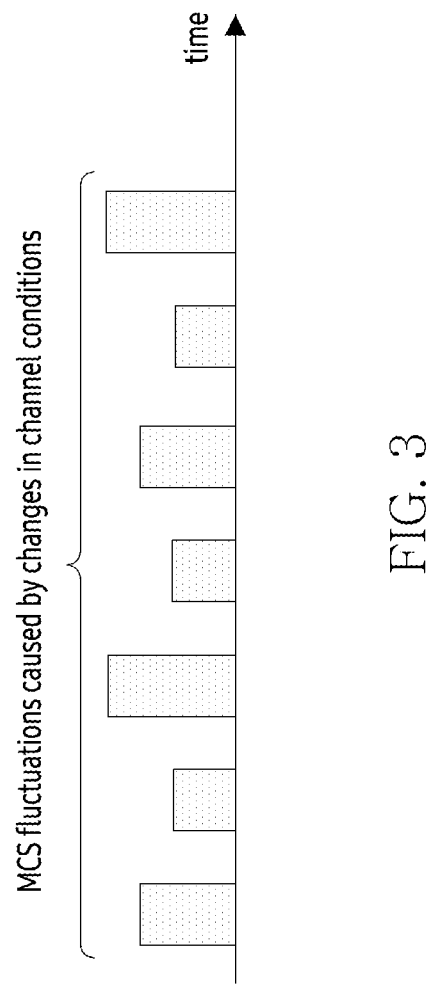
FIG. 3 is a diagram illustrating modulation and coding scheme (MCS) fluctuations caused by changes in channel conditions according to various embodiments.

Wherein, his_sym, his_S and his_I denote the historical number of symbols, historical signal values and historical interference values, respectively;

$$sym_i', S_i' \text{ and } I_i'$$

denote the estimated number of symbols, estimated signal values, and estimated interference values for $CC_i$, respectively; in general, sym is time-dependent and corresponds to the corresponding symbol level and takes values in the range (0, 14), S and I correspond to the corresponding signal and interference levels respectively; $f_{SA}(\bullet)$ denotes the (situation) estimation function, which can also be understood as the (situation) estimation process to determine the estimated transmission capacity parameters according to the historical transmission capacity parameters;

$$SINR_i'$$

denotes the estimated SINR, which takes values related to the power allocation ratio. Specifically, $P_{Total}$ denotes the maximum transmit power, $R_i \cdot P_{Total}$ denotes the transmit power allocated to $CC_i$ at any candidate power allocation ratio, and $R_i \cdot P_{Total}$ is used to change the effect of the estimated signal value $$S_i'$$

in the estimated SINR; $f_{offset}(\bullet)$ denotes the power adaptation function, which can also be understood as a pre-compensation process for the impact of channel variations; N denotes the noise value, which may not be estimated considering that the noise is usually Gaussian white noise, or, $$N_i'$$

may be used instead of N, e.g., an estimated noise value is used;

$$MCS_i'$$

denotes the estimated MCS; $f_{MCS}(\bullet)$ denotes the calculation process for $$MCS_i',$$

which can be specifically a table mapping process, e.g., based on the number of symbols sym, SINR and the maximum modulation mode (Mod) (e.g., 16 Quadrature Amplitude Modulation (QAM), 256 QAM, 1024 QAM) supported by the UE for $CC_i$ to the MCS mapping, capable of representing the MCS variations caused by the channel conditions (e.g. FIG. 3 illustrates the MCS fluctuations caused by change in the channel condition), Mod is the UE capacity constant and different UEs will correspond to different modules.

It should be noted that, $f_{SA\_1}$, $f_{SA\_2}$ and $f_{SA\_3}$ can take the same estimation treatment or different estimation treatments. As an example, an optional estimation processing is by Kalman filtering algorithm, which enables continuous situation evaluation and single point situation evaluation. Wherein, $f_{SA\_1}$, $f_{SA\_2}$ and $f_{SA\_3}$ can be all processed by Kalman filtering algorithm, or partly by Kalman filtering algorithm, and the remaining by other estimation algorithms, one skilled in the art can adopt a suitable estimation processing according to the actual situation, and an embodiment is not limited.

Figure 4A:
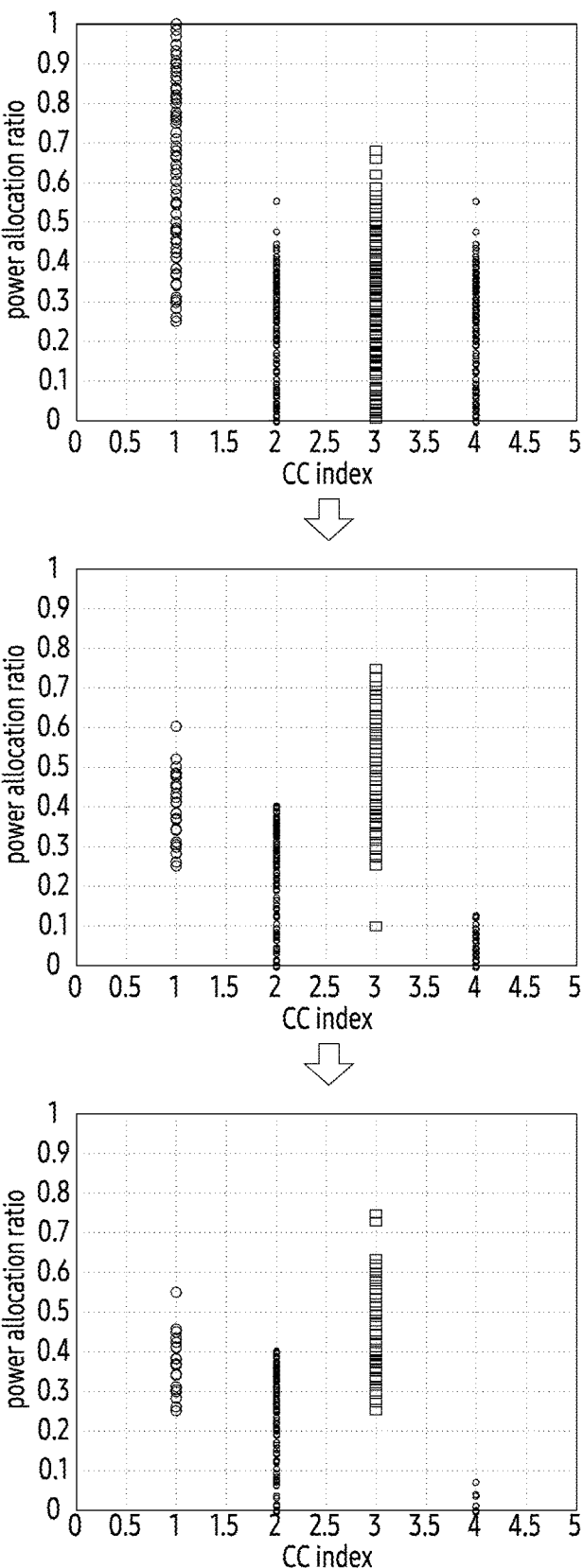
FIG. 4A is a diagram illustrating example power allocation ratio and particle swarm optimization (PSO) convergence process provided by an embodiment of the present application.
Figure 4B:
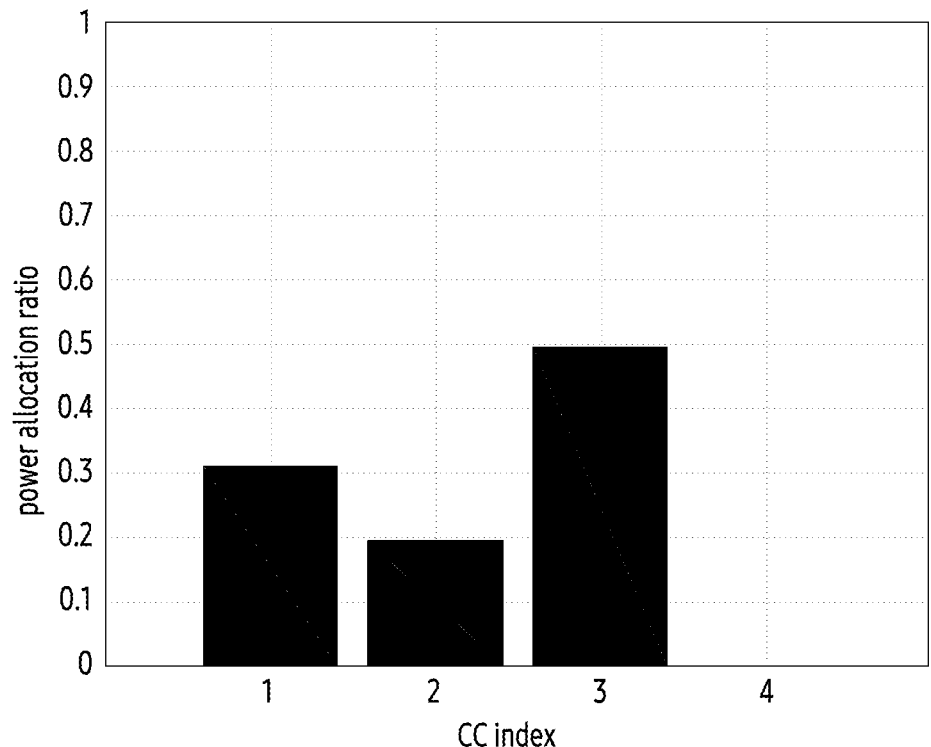
FIG. 4B is a diagram illustrating the result of a target power allocation ratio provided according to various embodiments.
Figure 4C:
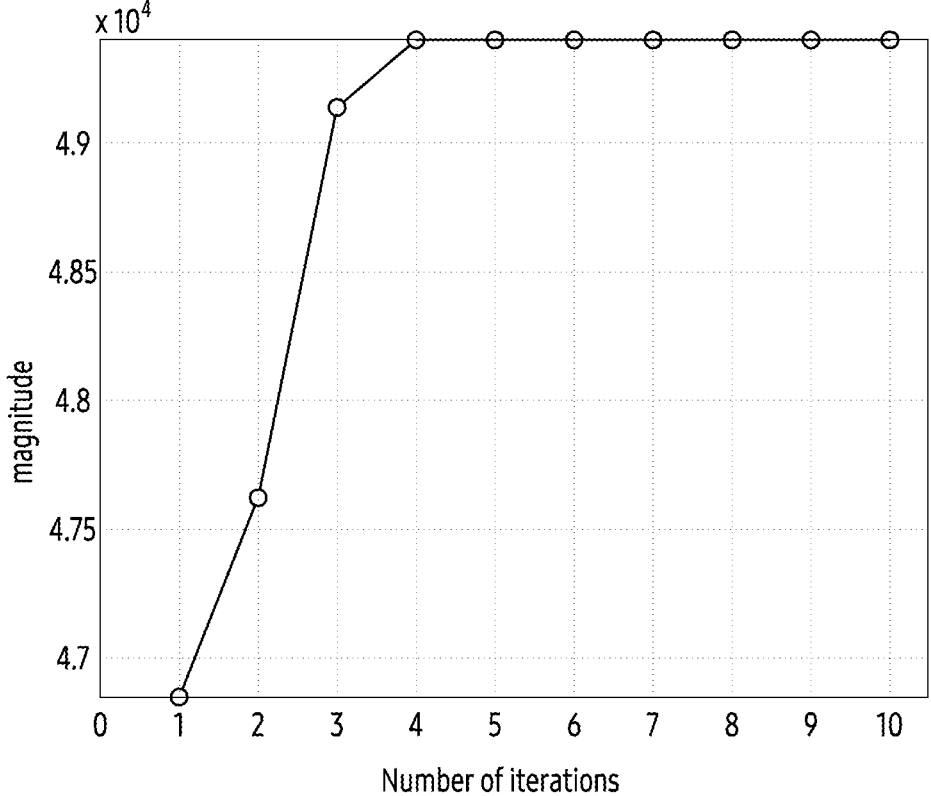
FIG. 4C is graph illustrating the iteration rate of the PSO algorithm according to various embodiments.

The situation estimation in the intelligent power allocation method may also use the Particle Swarm Optimization (PSO) algorithm, which is an evolutionary computing technique whose basic idea is to find the preferred solution through collaboration and information sharing among individuals in a population. Taking the intelligent power allocation of 4 CCs as an example, the PSO calculation process can be shown in FIGS. 4A, 4B and 4C. Wherein, FIG. 4A shows the power allocation ratio and the PSO convergence process, FIG. 4B shows the result of the target power allocation ratio, and FIG. 4C shows the iteration rate of the PSO algorithm (the TBS magnitude value converges after four iterations). It can be seen that the PSO algorithm converges quite fast when achieving the target power allocation ratio iteration. The results can be derived from extensive experiments that the iteration rate can reach convergence in less than 4 iterations in the case of 4 CCs, which is consistent with most cases.

In various embodiments, it is also possible to determine the estimated SINR based on the historical SINR, and then determine the estimated MCS based on the estimated SINR, or determine the estimated MCS directly based on the historical MCS, or determine the estimated number of symbols and the estimated MCS based on the historical number of symbols, historical signal values, historical interference values, etc. It should be understood that the above-mentioned calculation methods of the estimated MCS are only examples and can be suitably extended by those skilled in the art based on these examples, all of which should be included within the scope of protection of the disclosure. For example, determining the estimated transmission capacity parameter may also include, but is not limited to, determining the estimated number of layers based on the historical number of layers, etc.

In addition, an embodiment may, in the process of calculating the estimated transmission capacity parameters, apply the impact on the transmit power formulated on each carrier through the power allocation to the useful signal, thereby achieving a pre-compensation for the impact caused by the real-time changing channel during the PHR reporting period. For example, the above operation of determining the estimated transmission capacity parameter of each carrier corresponding to any of the candidate power allocation ratios according to the historical transmission capacity parameter of each carrier may include: determining a compensation amount of the predetermined estimated transmission capacity parameter of each carrier corresponding to any of the candidate power allocation ratios; and determining, according to the historical transmission capacity parameter and the compensation amount of each carrier, the estimated transmission capacity parameter of each carrier corresponding to any of the candidate power allocation ratios.

Continuing with the above example of calculating the estimated MCS values through equations 3 to 7, in equation 5 above, the formulated impact (donated as the compensation amount of the estimated signal value of each carrier after power allocation) is applied to the estimated signal value, thereby achieving a pre-compensation for the impact caused by the real-time changing channel. The implementation can be found in the description of Equation V above and will not be repeated here. Based on this, one skilled in the art can set the predetermined estimated transmission capacity parameters to be compensated, as well as the method for calculating the compensation amount and the compensation method, according to the actual situation, and an embodiment is not limited here.

A feasible implementation is provided by an embodiment to determine the compensation amount of the predetermined estimated transmission capacity parameter of each carrier corresponding to any of the candidate power allocation ratios according to at least one of the transmit power of each carrier corresponding to any of the candidate power allocation ratios, the transmission loss of each carrier, and a predetermined adjustment factor.

Taking the above example of calculating the compensation amount of the estimated signal value through equation V, the calculation process of this implementation can be as shown in the following equation VIII.

$$f_{offset}(R_i \cdot P_{Total}) = \beta \cdot \left( \frac{R_i \cdot P_{Total}}{Loss_i} - S'_i \right) \qquad \text{Equation VIII}$$

Wherein, $$S'_i$$

denotes the estimated signal value of $CC_i$; $P_{Total}$ denotes the maximum transmit power, $R_i \cdot P_{Total}$ denotes the transmit power allocated to $CC_i$ at any candidate power allocation ratio; $Loss_i$ denotes the transmission loss of $CC_i$; $\beta$ is the adjustment factor, $\beta$ has a value range of [0, 1], optionally, $\beta=2/\{2+\exp[-3 \cdot (N-3)]\}$, N denotes the total number of CCs, and in other embodiments, $\beta$ may also be other values.

In an embodiment, a feasible implementation is provided for the above operation of determining a resource block allocated for each carrier corresponding to any of the candidate power allocation ratios, for example, it may include: determining a resource block allocated for each carrier corresponding to any of the candidate power allocation ratios according to the transmit power of each carrier corresponding to any of the candidate power allocation ratios, and the resource block parameters corresponding to each carrier.

As an example, it may be that for a candidate power allocation ratio, based on the transmit power of each CC and the RB parameters of each CC, on the basis of Equation II above, the RB allocated for each CC is calculated by Equation IX as follows.

$$RB_i = f_{RB}(R_i \cdot P_{Total}, CC_i RB \text{ parameters}) \qquad \text{Equation IX}$$

Wherein, $P_{Total}$ denotes the maximum transmit power, $R_i \cdot P_{Total}$ denotes the transmit power allocated to $CC_i$ for any of the candidate power allocation ratios, so that the values $RB_i$ are related to the power allocation ratio; $CC_i$ RB parameters denotes the RB parameter of $CC_i$, which relates to the power demand of the transmission unit and the power allocation boundary, and $f_{RB}(\bullet)$ denotes that the $R_i \cdot P_{Total}$ and $CC_i$ RB parameters$_i$ are processed accordingly to obtain $RB_i$ of $CC_i$ corresponding to the corresponding candidate power allocation ratio.

For example, the resource block parameters may include at least one of the following: a power headroom report, a power demand for the resource block, and a power allocation boundary of the carrier aggregation. That is, the way to calculate the RBs allocated for each CC can be specified in the following Equation X.

$$RB_i = f_{RB}(R_i \cdot P_{Total}, PHR_i, P_i, reqRB_i) \qquad \text{Equation X}$$

Wherein $PHR_i$ denotes the index of the UE power headroom report corresponding to $CC_i$, $P_i$ denotes another power limit corresponding to $CC_i$ (maximum power per carrier, e.g., the power allocation boundary) in the CA scenario, and $reqRB_i$ denotes the power demand for $CC_i$; other non-exhaustive contents can be found in the introduction to Equation IX and will not be repeated here.

From the above presentation, with the conventional carrier power allocation technique, the transmission capacity is directly brought into the calculation using instantaneous values, without considering the impact of these instantaneous values on the transmission capacity over time during the PHR reporting period. Moreover, the power of each carrier is the same in the conventional technique.

Compared to the conventional technology in which only the instantaneous values of each transmission capacity parameter are considered for use in calculating the carrier transmission capacity, which makes the transmission capacity parameter unable to reflect the impact of carrier transmission capacity fluctuations due to dynamic changes in the wireless channel during a PHR reporting period (e.g., the MCS results that depend on the instantaneous SINR cannot reflect the MCS fluctuations during the PHR reporting period), the power allocation method provided an embodiment employs situation estimation, uses dynamic estimation values of the original instantaneous parameter values (taking into account the historical change situation in parameter) to play a part in the calculation of the carrier transmission capacity (e.g.

$$sym'_i, S'_i, I'_i \text{ and } Layer'_i$$

are no longer instantaneous values, but estimation values based on historical data; also, for example, the calculated $$MCS'_i$$

at the current time can reflect the impact of signal changes within a PHR reporting period). For example, by first obtaining the estimated SINR value and further calculating to obtain the estimated TBS value, e.g., the capability of the carrier (capacity value, reflected as the TBS of the carrier) is calculated according to the estimated SINR value, and the impact of changes in these parameters in future periods is estimated. Moreover, the useful signal strength variation brought about by the assumption of adopting a certain power allocation ratio scheme is also taken into account in the carrier transmission capacity estimation, and the impact of the channel variation during the PHR reporting periods is also considered by calculating the compensation amounts of the predetermined estimated transmission capacity parameters, thereby solving the problem of inaccurate carrier capability estimation in uplink multi-carrier power allocation and significantly improving the robustness of the carrier transmission capacity estimation.

In an embodiment, a feasible implementation is provided for the above operation of determining the total carrier transmission capacity respectively corresponding to at least one candidate power allocation ratio according to the transmission capacity of each carrier respectively corresponding to at least one candidate power allocation ratio, to achieve automatic iteration of the target power allocation ratio. Specifically, it may include: iteratively determining a maximum total carrier transmission capacity in the total carrier transmission capacities corresponding to the at least one candidate power allocation ratio according to the transmission capacity of each carrier corresponding to the at least one candidate power allocation ratio until an end-of-iteration condition is satisfied to obtain a candidate power allocation ratio corresponding to the maximum total carrier transmission capacity of the at least one candidate power allocation ratio.

It will be understood that some or all of the example embodiments are performed assuming that the results of power allocation on each carrier are known. And before making the power allocation decision, in order to avoid the large computational cost that may be caused by determining in advance an infinite power allocation scheme (specifically, the ratio of full power allocated on each carrier, e.g., the proportion of all candidate power allocations), an embodiment considers the entire decision process of the power allocation scheme as a dynamic optimization process. According to at least one of the above embodiments, the optimization problem can be expressed as Equation XI below.

$$F = \arg\max\left(\sum_{i=0}^{N-1} f_{TBS}(sym'_i, MCS'_i, Layer_i,\right.$$

$$\left. wave, Mod, f_{RB}(R_i \cdot P_{Total}, PHR_i, P_i, reqRB_i))\right)$$

Equation XI

Wherein $Layer_i$ denotes the number of layers corresponding to $CC_i$; in practice, instantaneous values or estimated values $$Layer'_i$$

calculated based on historical values can be used for the number of layers; wave (waveform) (e.g., cyclic prefix (CP)-Orthogonal Frequency Division Multiplexing (OFDM), Discrete Fourier Transform-spreading (DFT-s) OFDM) is the constant that characterizes the UE capability, and other non-exhaustive contents can be found in the introduction to the equations such as Equation I, Equation II, Equation IX, and Equation X, etc., which will not be repeated here.

It should be noted that each of the above Equations involving the power allocation ratio can satisfy the condition $$\sum_{i=0}^{N-1} R_i = 1, R_i \geq 0.$$

In addition, the transmission capacity parameters $$sym'_i, MCS'_i, and Layer_i$$

in Equation XI can be replaced with other parameters according to different processing process, which are not specifically limited in an embodiment. It can be understood that if the transmission capacity parameters do not use estimated values, but all use instantaneous values, the automatic iterative selection method according to the candidate power allocation ratio provided by an embodiment can also reduce the power waste of the UE to some extent. And the estimated values obtained from the situation estimation are used in the automatic iterative selection method of the candidate power allocation ratio provided by an embodiment, so that the obtained target power allocation ratio has better time adaptability and can further reduce the power waste of the UE compared with using the instantaneous value to achieve significant UE power saving effect.

Figure 5A:
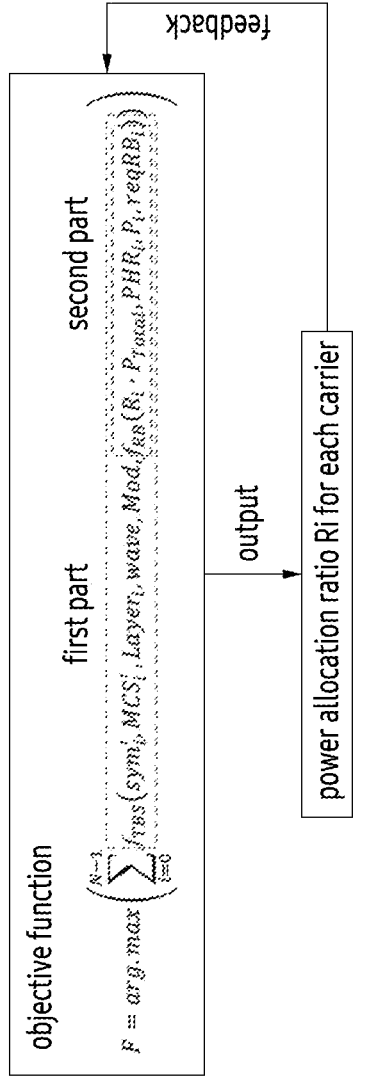
FIG. 5A is a block diagram illustrating example iterative determination of a target power allocation ratio according to various embodiments.

Further, the process of intelligently iteratively determining the target power allocation ratio is shown in FIG. 5A, wherein the candidate power allocation ratio is iteratively updated based on the objective function (e.g., Equation XI above can be used, or other functions), wherein the second part of the objective function corresponds to the process of calculating the RB allocated for each CC, and the first part corresponds to the process of calculating the RBs for each CC according to the estimated transmission capacity parameters of each CC, and the first part corresponds to the process of calculating the transmission capacity corresponding to each CC based on the estimated transmission capacity parameters of each CC and the RBs allocated for each CC, and the specific implementation of which can be found above and will not be repeated here. Each iteration outputs the total TBS value and its corresponding power allocation ratio $R_i$ for each carrier, which is fed to the objective function for further iterations until the end-of-iteration condition is satisfied, and the last output total TBS value is determined as the maximum total TBS value, and the power allocation ratio $R_i$ of each carrier corresponding to this maximum total TB S value is determined.

Figure 5B:
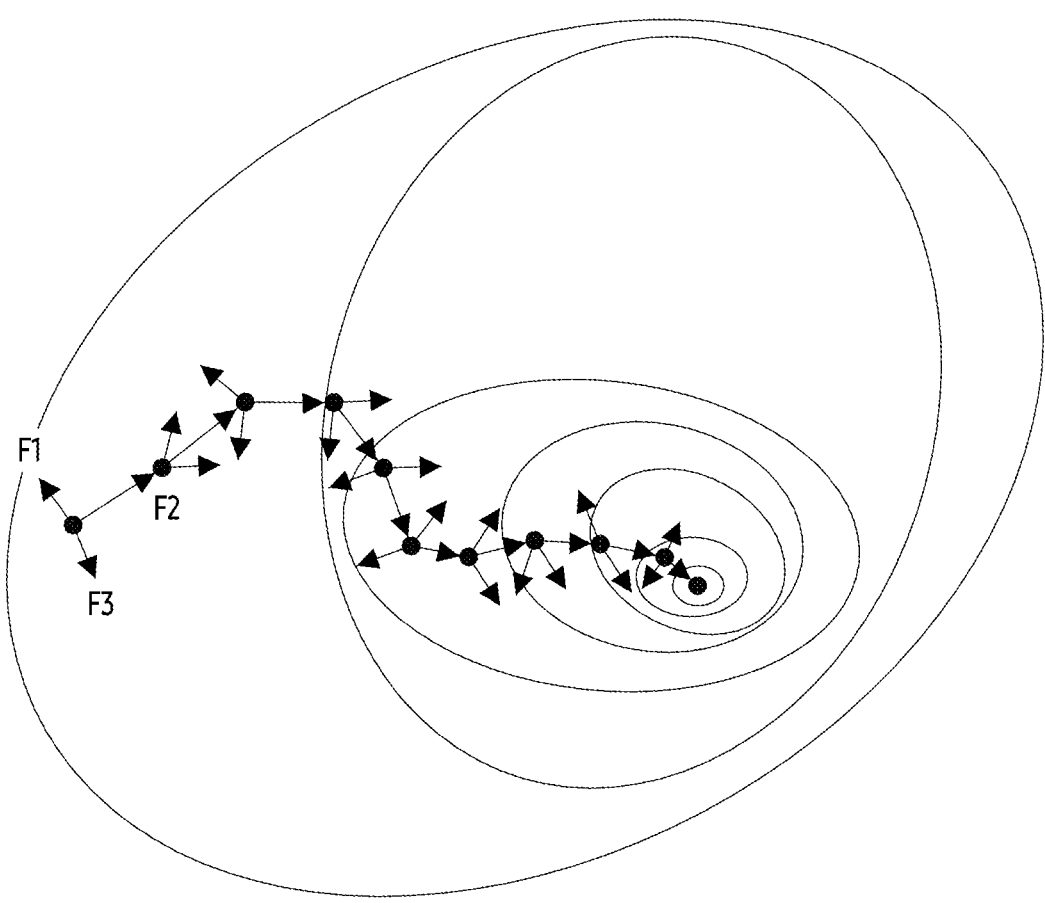
FIG. 5B is a diagram illustrating an example F-value space according to various embodiments.

Continuing with the example that the carrier transmission capacity is the TBS of the carriers, the maximum total TBS is obtained by iteratively solving the estimated TBS parameters of each carrier by updating the calculation, e.g., inputting the estimated TBS parameter of each carrier and outputting the maximum total TBS value and its corresponding target power allocation ratio $R_i$ of each carrier Optionally, the above optimization problem may use the gradient descent method, the solution process of which can be shown schematically in the F-value space of FIG. 5B, including:

randomly selecting three (or other number, this number is only an example and should not be interpreted as a limitation of the present application) candidate power allocation ratios in all candidate power allocation ratios, and calculating the values of the function F to obtain $F_1$, $F_2$ and $F_3$, respectively.

determining the maximum difference in the differences between $F_1$, $F_2$ and $F_3$, e.g., calculate $\max\{(F_1-F_2, F_1-F_3, F_2-F_3, F_2-F_1, F_3-F_1, F_3-F_2)\}$, which is used to determine the origin of the next iteration. For example, in FIG. 5b, assuming that $F_3-F_2$ is the maximum difference of this iteration, then $F_2$ can be used as the starting point of the next iteration.

For each iteration, the direction of convergence of the algorithm corresponds to a step distance associated with the maximum difference value obtained. When cases that the change in the F-value is less than a preset threshold value, or a predetermined number of iterations is reached, or a computation timeout is reached (optional end-of-iteration conditions, but not limited to this) are satisfied, the iteration is stopped and the candidate power allocation ratio corresponding to the last set of F-values is output as the preferred solution.

It can be understood that the specific solution method that can be used for the above optimization problem is not limited to the gradient descent method, but other suitable artificial intelligence (AI) algorithms can also be used, which can also be applied to the present application, and therefore should also be included in the scope of protection of the present application.

A method for automatically iteratively determining a target power allocation ratio according to various embodiments aims to obtain, through a finite number of iterative calculations, a preferred scheme for power allocation over multiple carriers of the carrier aggregation to maximize and/or improve the overall throughput of all carriers of the carrier aggregation (the sum of the transmission capacities of the corresponding individual carriers for a given candidate power allocation ratio). Further, by combining each parameter associated with the power allocation ratio, the overall throughput resulting from each candidate power allocation ratio can be calculated correspondingly for each of them. The AI-based processing flow can lead to a flexible power allocation strategy, improve CA transmission efficiency, and reduce power waste of the UE.

After determining the target power allocation ratio based on at least one embodiment and determining the transmit power respectively corresponding to each carrier according to the target power allocation ratio, the base station does not need to estimate the final TBS value again, but can directly use the maximum total TBS value calculated by the above operations, saving the computing resources of the base station.

In an embodiment, considering that in the carrier aggregation scenario, the signals of the control plane are carried by the primary cell (Pcell), e.g., the primary carrier is responsible for transmitting all the control signaling of the UE. The power used by the signals of the control plane needs to be protected when dynamically controlling the transmit power of each carrier, e.g., a lowest power protection value needs to be set for the transmit power of the primary carrier in the case of dynamic power allocation in order to ensure that the service will not be interrupted due to the poor quality of the control channel. In other words, the intelligent power allocation of the user-plane power will exclude the control-plane power of the primary CC.

In an embodiment, the protection of the power used by the control plane (which may also be referred to as control signal power or primary carrier control signal power) for the next PHR reporting period is achieved by allocating to the primary carrier (e.g., the primary cell) not less than the minimum power required by the control plane, and optionally, the estimation of the primary carrier control plane power protection is performed.

For example, on the basis of the above embodiment, operation S101 may include:

Operation SA: Determining the estimated control plane power of the primary carrier.

In an embodiment, the estimated control plane power is the estimated protection power of the primary carrier, which can also be understood as the reserved minimum power value.

Operation SB: Based on the estimated control plane power, determining the target power allocation ratio for each carrier.

For example, when determining the target power allocation ratio for each carrier, the power allocation ratio for the primary carrier is determined to be not smaller than the ratio of the estimated control plane power to the total power based on the estimated control plane power.

In this configuration, the power allocation ratio can still refer to the percentage of the power allocated on each carrier of the carrier aggregation to the total power, and the sum of the ratio values respectively corresponding to all carriers can still be 1. The added protection is that the power allocation ratio for the primary carrier is not less than the ratio of the estimated control plane power to the total power, e.g., $$\sum_{i=0}^{N-1} R_i = 1, R_i \geq 0, \text{ and } R_0 \geq R'_0,$$

wherein, $R_i$ denotes the ratio value allocated for $CC_i$; N denotes the total number of carriers; $R_0$ denotes the power allocation ratio for the primary carriers;

$$R'_0$$

denotes the ratio of the estimated control plane power to the total power, and the power corresponding to $$R'_0$$

is the lower boundary (minimum threshold) of the power allocated to the primary carrier.

In combination with each of the above embodiments, each of the above equations involving the power allocation ratio can satisfy the condition $$\sum_{i=0}^{N-1} R_i = 1, R_i \geq 0, \text{ and } R_0 \geq R'_0.$$

For example, by combining an embodiment with FIG. 2, it can be seen that assuming that CC1 is the primary carrier, the power ratio for CC1 corresponding to each power allocation ratio should be greater than $$R'_0.$$

A feasible implementation is provided for operation SA in an embodiment, it may include: determining an estimated control plane power of the primary carrier according to the historical control plane power of the primary carrier.

Since the control plane power varies according to a large time granularity, such as once per PHR reporting period, the estimated control plane power value may be estimated based on the historical control plane power at a large time granularity (e.g., PHR reporting period level), e.g., one or more large time granularity historical primary cell control plane power is input and the estimated control plane power is output, and then the ratio $$R'_0$$

of the estimated control plane power to the total power can be obtained. Optionally, the estimated control plane power can be updated repeatedly with one PHR reporting period.

Figure 6A:
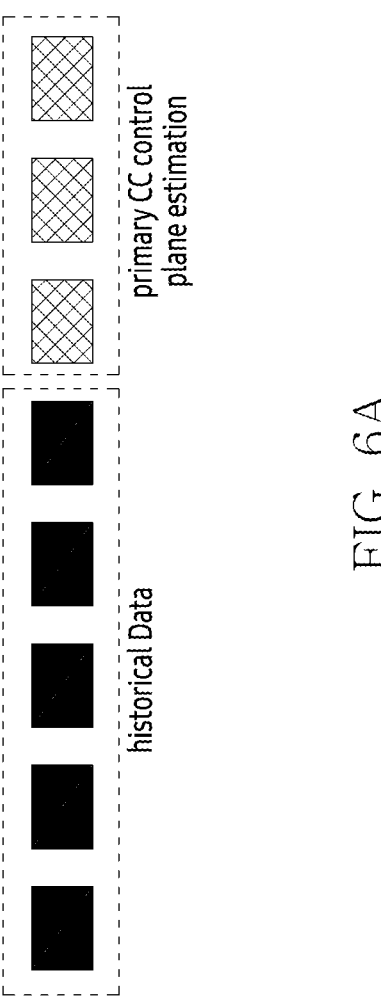
FIG. 6A is a diagram illustrating example estimated primary carrier control plane power values according to various embodiments.
Figure 6B:
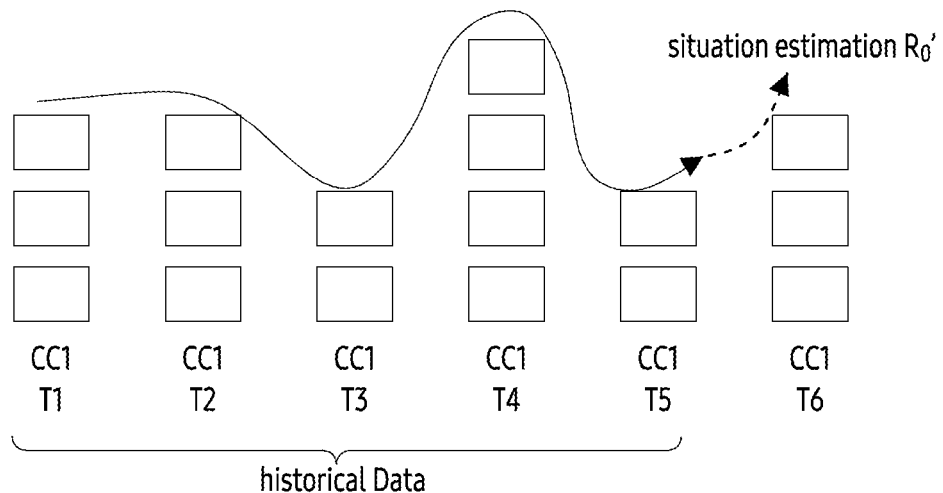
FIG. 6B is a diagram illustrating example situation-estimated primary carrier control plane power values according to various embodiments.

Further, since the control plane power on the primary carrier is variable for each power allocation process, an embodiment discloses to estimate the primary carrier control plane power based on the historical data, as shown in FIG. 6A. For example, the primary carrier control plane power estimation based on the situation estimation can be used, as shown in FIG. 6B, e.g., based on the historical control plane power of the primary carrier, the estimated control plane power value of the primary carrier can be obtained by the situation estimation. The details of the implementation of the situation estimation are provided above and will not be repeated here.

Figure 6C:
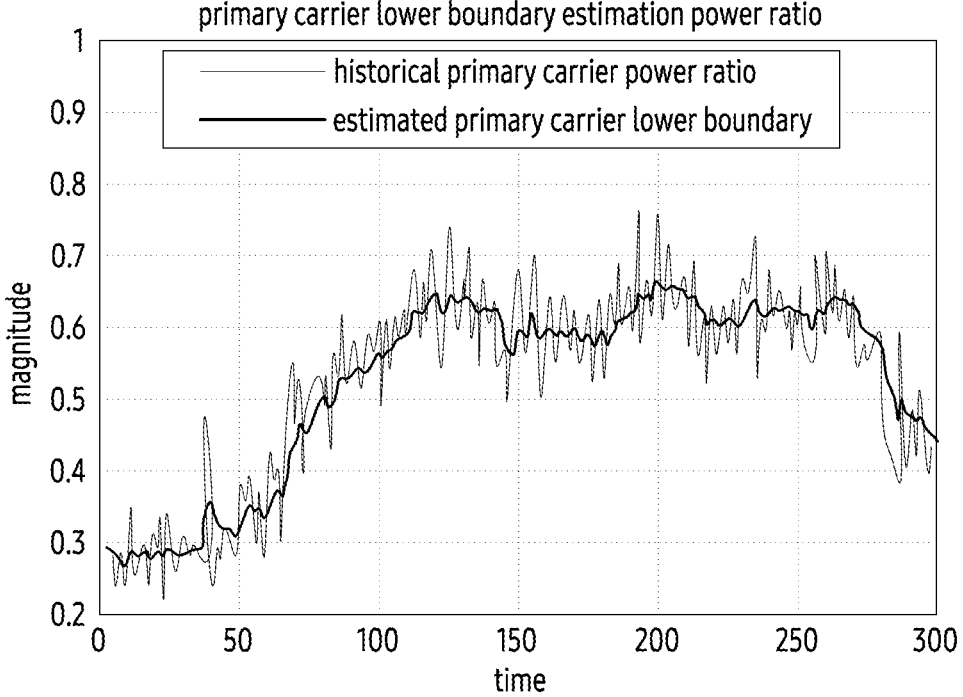
FIG. 6C is graph illustrating the accuracy of the estimation results according to various embodiments.

FIG. 6C is a graph illustrating the results of the situation estimation of the control plane power value of the primary carrier. Taking the Kalman filter algorithm as an example, e.g., the estimation results based on the Kalman filter algorithm are shown in FIG. 6C, and it can be seen that the estimation results have less burrs compared to the historical data and thus have a high accuracy.

Figure 7A:
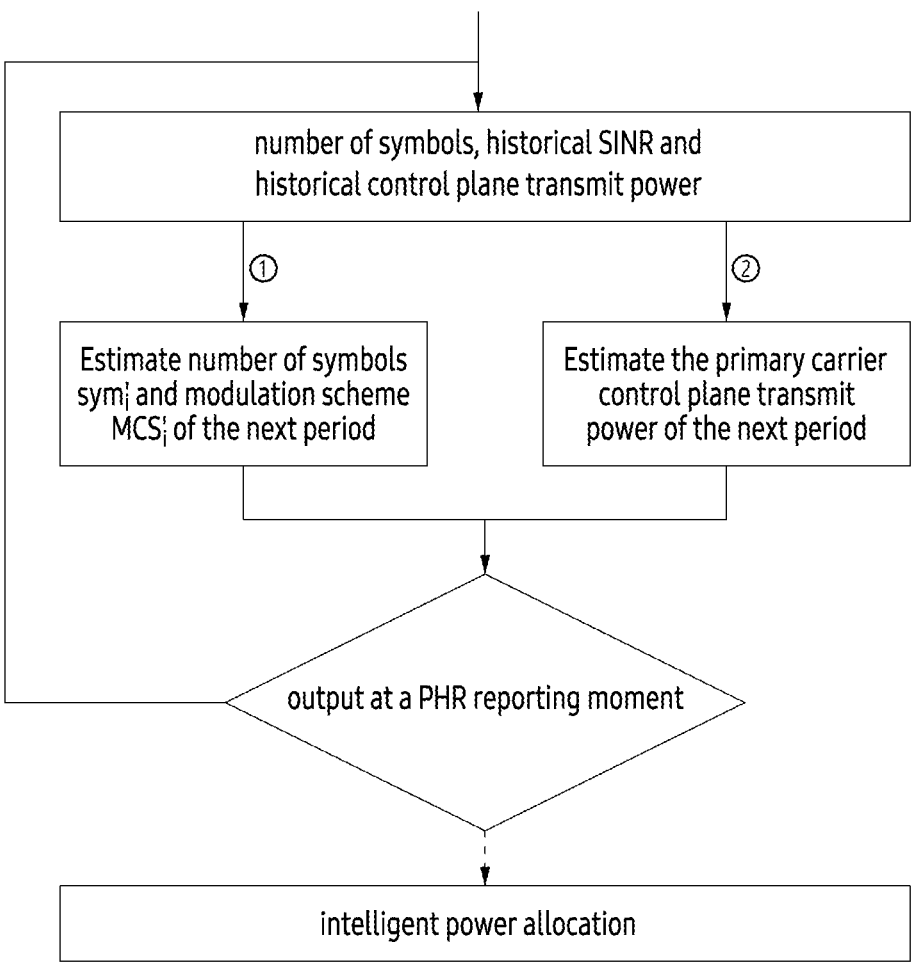
FIG. 7A is flowchart illustrating an example carrier aggregation situation estimation according to various embodiments.

In an embodiment, an example of carrier aggregation situation estimation is given by FIG. 7A. As shown in FIG. 7A, the estimated transmission capacity parameters for the next PHR reporting periods (e.g., estimated number of symbols $$sym'_i,$$

and estimated modulation scheme $$MCS'_i,$$

etc.) and the estimated control plane power of the primary carrier are estimated respectively based on the historical transmission capacity parameters (e.g., historical number of symbols and historical SINR) and historical control plane power, for output at the PHR reporting moment for intelligent power allocation (determining the target power allocation ratio for each carrier). The specific implementation can be referred to the above description and will not be repeated.

Figure 7B:
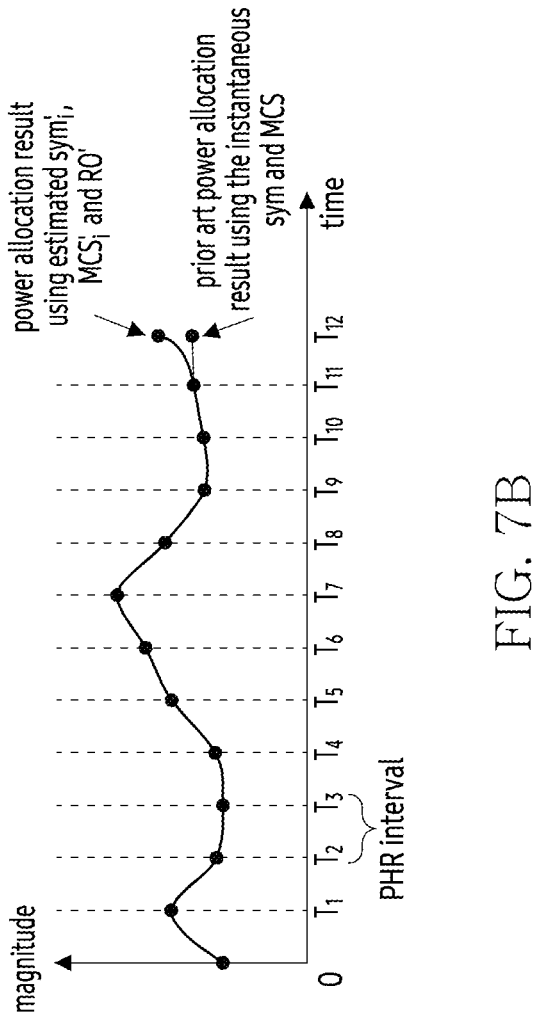
FIG. 7B is a graph illustrating example power allocation according to various embodiments.

FIG. 7B is an example of power allocation (containing historical allocation, traditional allocation and allocation of an embodiment). As shown in FIG. 7B, $T_1$~$T_{11}$ are historical power allocation results, it can be seen that the power allocation results of the prior art using instantaneous sym and MCS are very different from those of an embodiment using estimated $sym_i'$, $MCS_i'$ and R0', and that the power allocation results of an embodiment are more capable of conforming to the variation law of the channel.

Figure 8:
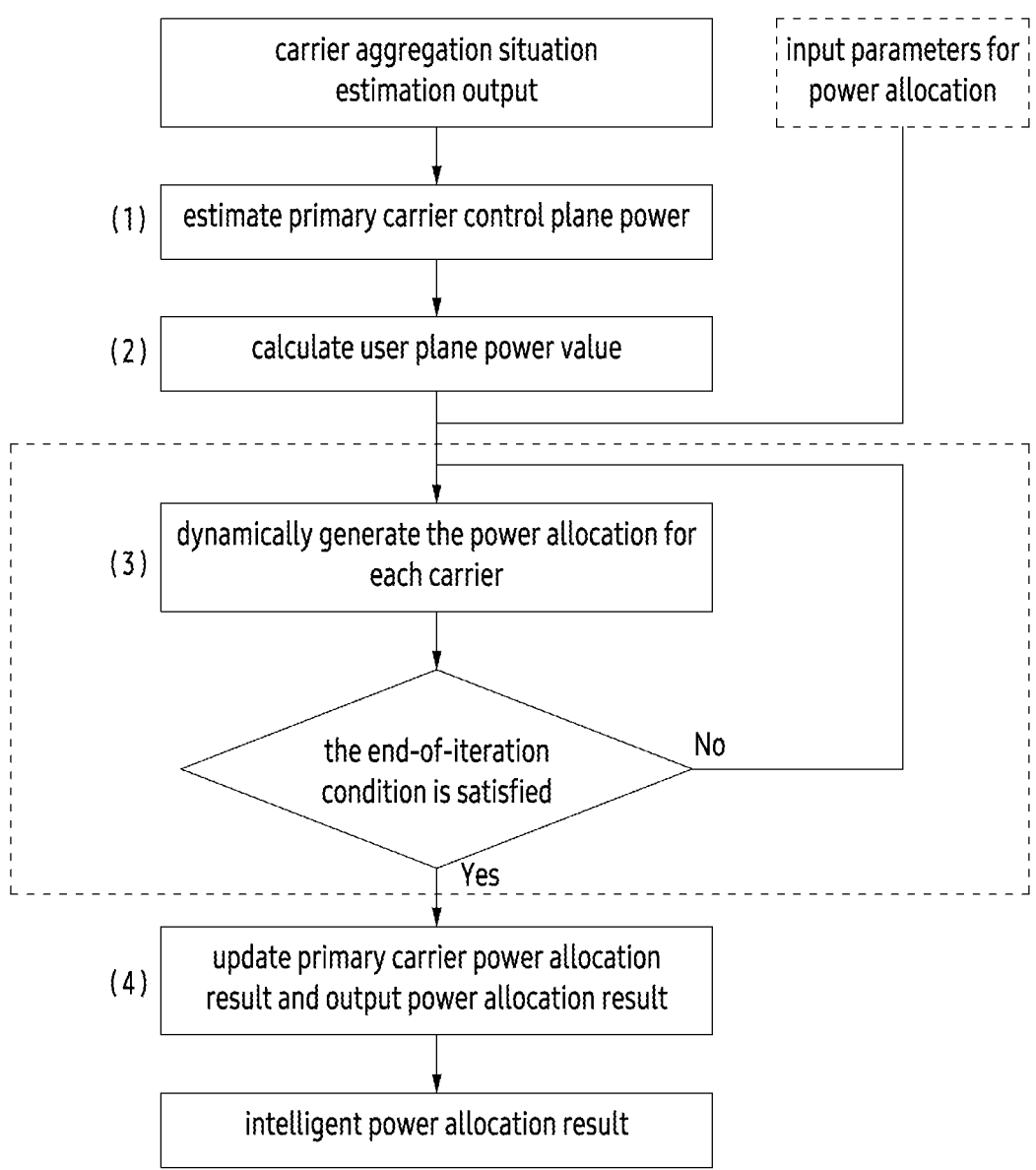
FIG. 8 is a flowchart illustrating example primary carrier power protection according to various embodiments.

In an embodiment, the flow of the primary carrier power protection can be shown in FIG. 8 as follows.

Operation (1): determining the control plane power for the primary carrier. The estimated control plane power for the primary carrier output from the situation estimation is obtained.

The input of this operation is the result of the situation estimation.

The output of this operation is the estimated control plane power of the primary carrier.

Operation (2): calculating the user-plane power. The calculation formula is: total power (e.g., maximum transmit power Equation XI)—estimated control plane power for the primary carrier.

The inputs of this operation are the maximum transmit power and the estimated control plane power for the primary carrier.

The output of this operation is the user-plane power.

Operation (3): calculating the target power allocation ratio scheme. Based on the power allocation input parameters (for example, see Equations I-XI above), the target power allocation ratio is calculated by iterations.

The inputs of this operation are MCS, number of symbols, estimation of each RB, and UE capacity, etc.

The outputs of this operation are target power allocation ratio and power for each CC.

Operation (4): updating the primary carrier power allocation result and generating the final power allocation result of each carrier. Wherein the power of the primary carrier is equal to the sum of the user-plane power obtained from the primary cell allocation and the control-plane power of the primary carrier, and the final power allocation result for each carrier and the corresponding TBS value are output.

The input of this operation is the final (target) power allocation ratio scheme.

The outputs of this operation are the transmit power and TBS of each CC.

The primary carrier power protection method provided by an embodiment enables to obtain a better scheme of power allocation over multiple carriers of the carrier aggregation to maximize and/or improve the overall throughput of all carriers of the carrier aggregation and to guarantee that the minimum transmit power on the primary carrier is not less than a boundary condition of the power required for the control signal to ensure the continuity of the service.

Figure 9:
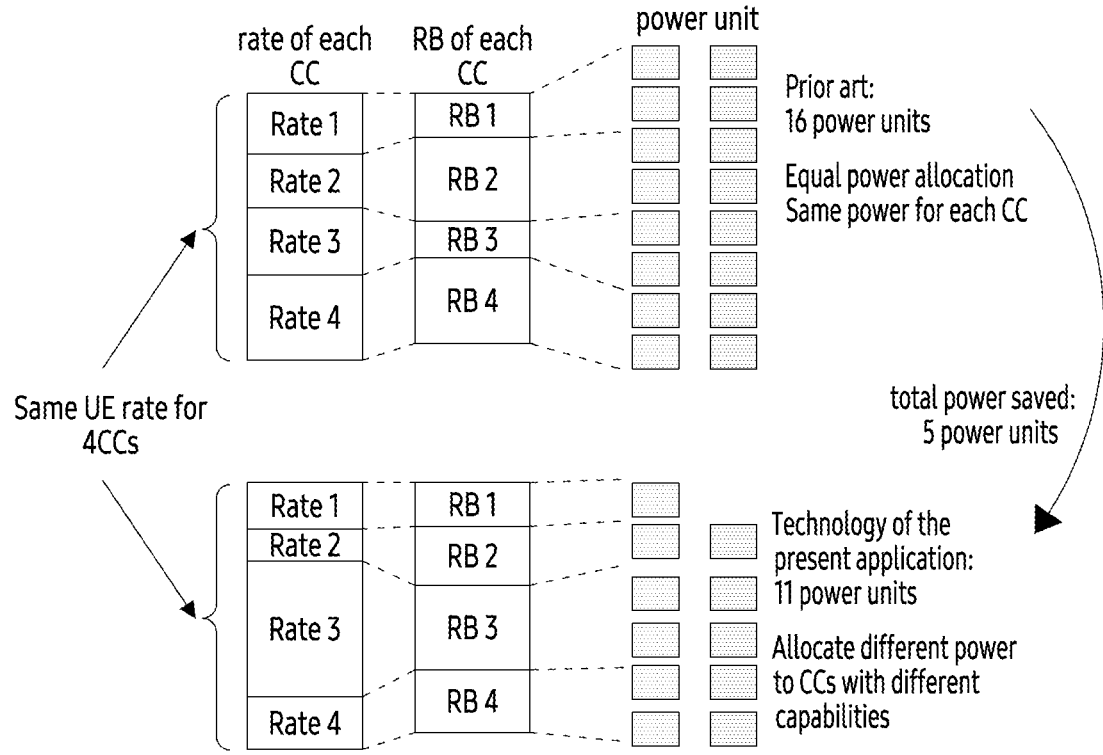
FIG. 9 is a diagram comparing the power allocation in the prior art with the power allocation according to various embodiments.

To facilitate a clearer understanding of the power saving effect that can be achieved by the intelligent power allocation method provided by an embodiment, a comparative example of the prior art power allocation with the power allocation of the technical solution of the present application is illustrated by FIG. 9. As shown in FIG. 9, taking four CCs as an example, the transmission rate of 4 CCs is fixed. According to the existing equal power allocation method, each CC has the same power, and a total of 16 power units are required for 4 CCs. In contrast, according to the intelligent power allocation method provided by an embodiment, different powers are allocated for CCs with different capabilities, and a total of 11 power units are required for 4 CCs. It can be seen that the total power saved includes 5 power units to effectively save UE power consumption while achieving the same transmission rate.

In an embodiment, in order to guarantee the robustness of the power allocation result, operation S102 can also include the following operations: comparing the first total carrier transmission capacity corresponding to the target power allocation ratio and the second total carrier transmission capacity corresponding to the historical power allocation method (e.g. equal power allocation method); if the total transmission capacity of the first carrier is larger than the total transmission capacity of the second carrier, the transmit power respectively corresponding to each carrier is determined according to the target power allocation ratio.

In other words, it is possible to compare the power allocation results obtained using the prior art (e.g., the historical power allocation method described above) and the power allocation optimization results obtained using dynamic power allocation (e.g., the target power allocation ratio) and the sizes of the respective total throughputs (transmission capacities), e.g., to compare the first total carrier transmission capacity and the second total carrier transmission capacity, and select the power allocation scheme with the larger transmission capacity to be applied to the power allocation. That is, when the first total carrier transmission capacity is larger than the second total carrier transmission capacity, the transmit power respectively corresponding to each carrier according to the target power allocation ratio is determined.

Through this scheme comparison and selection process, less total UE power consumption can be achieved without changing the overall transmission rate of the user, extending the time for the UE to perform high-speed data transmission, and improving the user's lasting experience of the high-speed rate data transmission service.

Figure 10A:
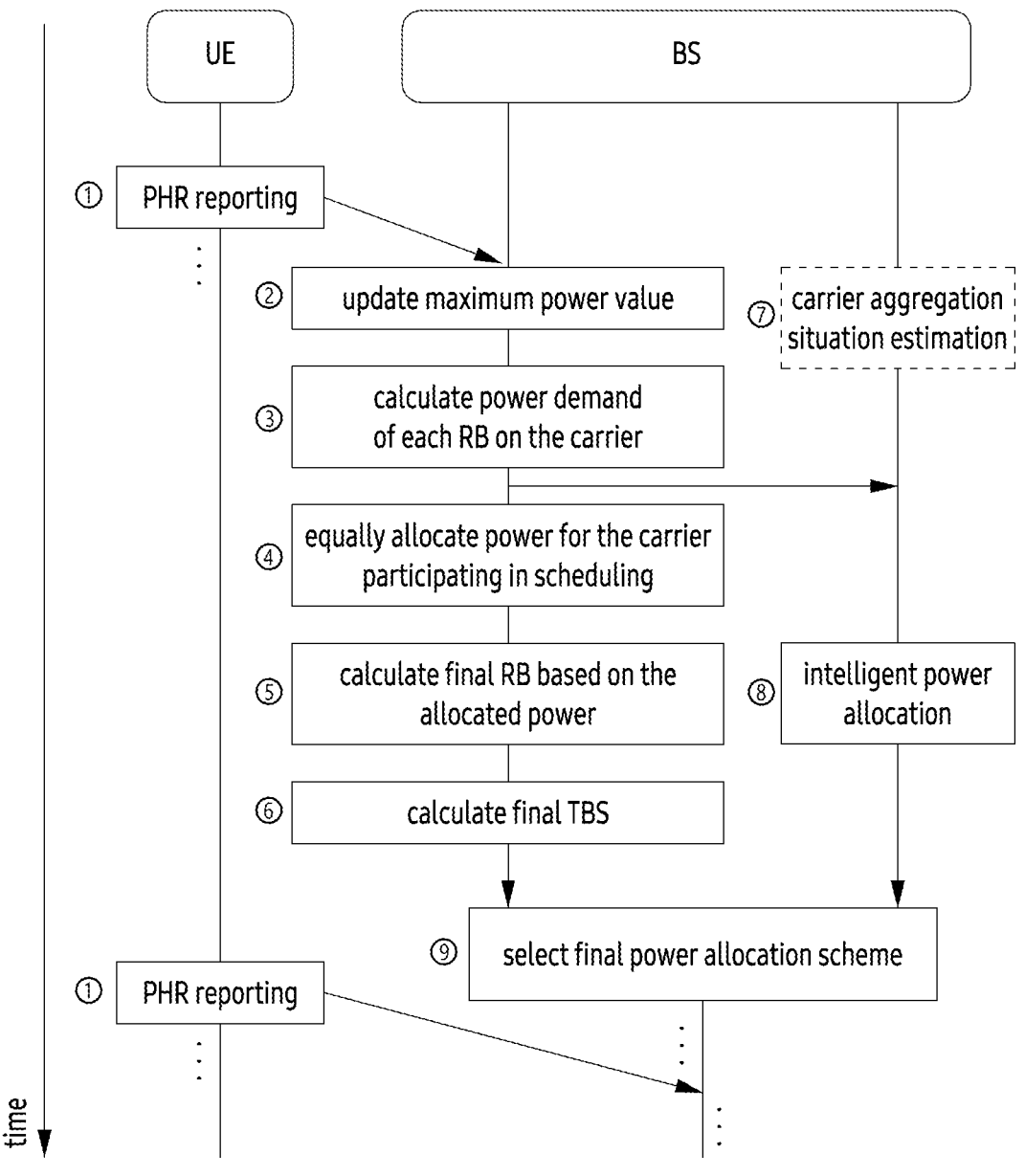
FIG. 10A is a signal flow diagram illustrating example processing flow of a first power allocation scheme according to various embodiments.

An example of a complete processing flow of a power allocation scheme is illustrated below in conjunction with one or more of the above embodiments by means of FIG. 10A, which may include the operations as shown in FIG. 10A.

Operation ①: UE performs PHR reporting. The UE periodically reports PHRs to the base station.

The outputs of this operation are the PHR and the maximum transmit power (max power).

Operation ②: The base station updates the maximum transmit power for the UE. The base station updates the maximum transmit power for the UE according to the bandwidth and scheduling situation.

The input of this operation is the maximum transmit power output from operation ①.

The output of this operation is the updated maximum transmit power (adjusted max power).

Operation ③: The base station calculates the power demand of each RB (Resource Block). The base station calculates the power demand of each RB and uses it to evaluate the effectiveness of the power allocation scheme.

The inputs of this operation are PHR, maximum transmit power, and number of the allocated RB (in the base station scheduling module).

The output of this operation is the power demand of each RB.

Operation ④: The base station decides the transmit power for the UE carrier. At the beginning of each PHR reporting period, the base station decides which carriers are used in this PHR reporting period to participate in the scheduling. The base station tries to use different numbers of carriers for scheduling in turn and distributes the total power of the UE evenly to all the carriers participating in scheduling to estimate the corresponding transport block size (TBS). For example, for a carrier aggregation with 4 carriers (the total number of carrier-aggregation carriers), the number of carriers participating in scheduling can be 2, 3, or 4. The corresponding TBS is calculated based on the number of all the carrier combinations participating in the scheduling, and the number of carriers participating in scheduling with the largest TBS is selected as the number of carriers participating in uplink scheduling in the next PHR reporting period, and the corresponding transmit power of each carrier is the total power for UE divided by the number of carriers participating in scheduling.

The inputs of this operation are the power demand of each RB, the total number of carrier-aggregation carriers, and the maximum transmit power.

The outputs of this operation are the number of carriers participating in the scheduling and the corresponding equal power allocation result.

Operation ⑤: The base station estimates the final number of RBs. The base station calculates the number of RBs to be actual scheduled according to the final selected number of carriers participating in the scheduling and the boundary conditions.

The inputs of this operation are the number of carriers participating in the scheduling and the corresponding equal power allocation results.

The output of this operation is the final number of RBs scheduled on each carrier.

Operation ⑥: The base station estimates the final TBS. The final TBS value is estimated based on the final number of RBs.

The input of this operation is the final number of RBs scheduled on each carrier.

The output of this operation is the estimated final TBS value.

Operation ⑦: Carrier aggregation situation estimation. The parameters required for the transmission capacity estimation are calculated and updated periodically to obtain the situation estimation value. The historical transmission capacity parameters are input and the estimated transmission capacity parameters, such as estimated number of symbols, and estimated MCS, etc., are output; and, the control plane transmit power for the primary carrier is estimated. Specific implementations can be found in the description of the various embodiments related to the situation estimation above and will not be repeated here.

Operation ⑧: Intelligent power allocation. Different transmit power values are set for each carrier according to the capability of each carrier. For example, the capability of each carrier can be obtained by updating the iterative solution for calculating the TBS estimation value. That is, the TBS parameters are input and the estimated TBS values are output. Wherein, the power of the primary carrier should be not smaller than its minimum power demand on the control plane. The specific implementation can be found in the introduction of the technical solutions provided by various embodiments, and will not be repeated here.

Figure 10B:
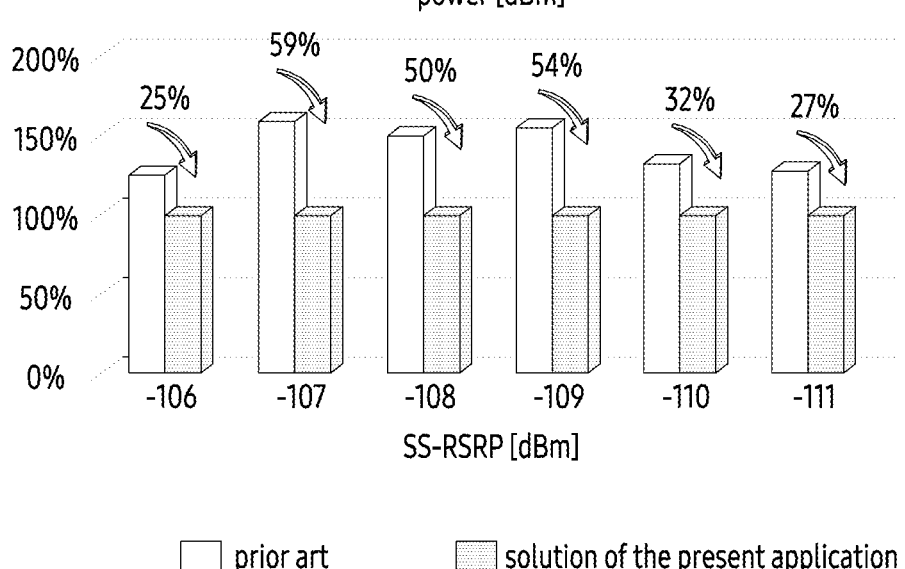
FIG. 10B is a diagram illustrating an example power saving comparison result of the first power allocation scheme according to various embodiments.

Operation ⑨: The base station compares the total transmission capacity of the power allocation schemes from operations ① to ⑥ with the total transmission capacity of the power allocation schemes obtained by the intelligent power allocation method provided by an embodiment, performs power allocation by selecting the power allocation corresponding to the maximum total transmission capacity, and outputs the final optimized power allocation result. The power saving comparison results shown in FIG. 10B are based on the power allocation processing flow shown in FIG. 10A. Wherein, the evaluation conditions may include:

Reference group: single cell, single UE. The UE uses carrier aggregation technology for uplink communication with full buffer service. The dynamic power allocation scheme disclosed in an embodiment is used to obtain different Synchronization Signal-Reference Signal Received Power (SS-RSRP) by changing the channel environment separately, and the throughput and the power allocation scheme of the Medium Access Control (MAC) layer of the UE are recorded. The throughput (e.g., transmission capacity) obtained by each SS-RSRP using the dynamic power allocation scheme provided in an embodiment is used as a reference value for the experimental group to adjust the conventional power allocation scheme to achieve the reference of the same throughput under the same SS-RSRP.

Experimental group: the service configuration is the same as the reference group, the difference is that the experimental group uses the traditional equal power allocation method.

The difference in power consumptions obtained by the two power allocation schemes to reach the same transmission rate (under the same channel conditions, e.g., the same SS-RSRP) are compared.

Consider that in real networks, most of the UEs in the cell are distributed in the region of signal −95 dBm to −115 dBm (e.g. −115 dbm<RSRP<−95 dBm). This region corresponds to the part where the implementation of the intelligent power allocation method provided by an embodiment is most effective, according to which the effectiveness of the intelligent power allocation method provided by an embodiment can be more clearly assessed.

Referring to FIG. 10B, it can be seen that under the same channel conditions, the intelligent power allocation method provided by an embodiment can effectively reduce the corresponding UE power compared to the conventional algorithm, saving power by approximately 20%-50%.

The complete example processing flow of another power allocation scheme is illustrated below by FIG. 11A in conjunction with one or more of the above embodiments, the difference being that no situation estimation operation is performed in this processing flow compared to FIG. 10A. That is, this example scheme is a simplified version of the previous example scheme, wherein the intelligent power allocation process calculates the TBS sum respectively by several fixed power allocation ratios, and then compares the TBS results of the strategies from operations ① to ⑥ to output the better power allocation scheme.

This example scheme can be deployed in New Radio (5G NR) Distributed Unit (DU) without CA situation estimation, providing multiple levels of power allocation ratios for UL CA CC power allocation options.

Figure 11A:
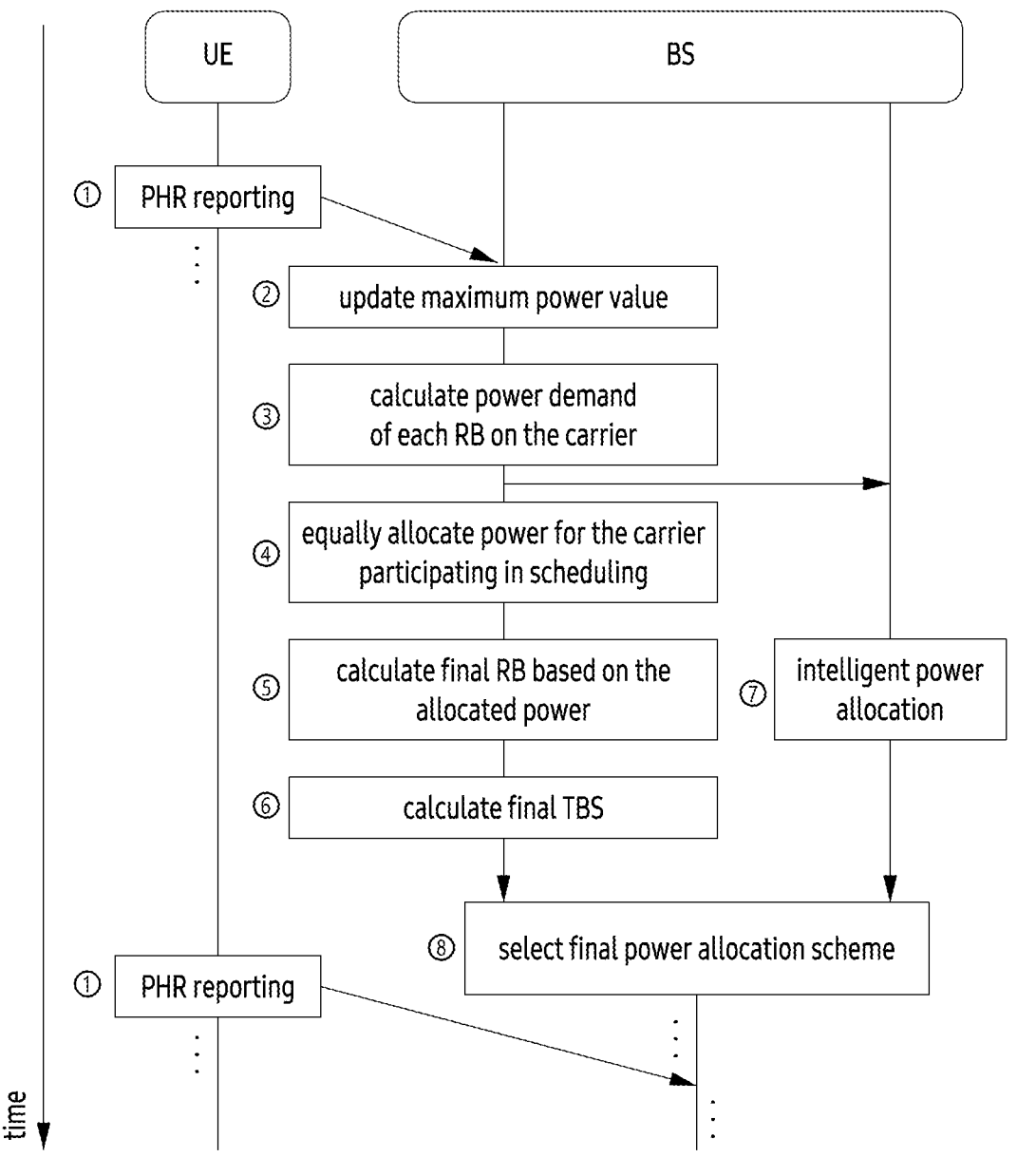
FIG. 11A is a signal flow diagram illustrating an example processing flow of a second power allocation scheme according to various embodiments.
Figure 11B:
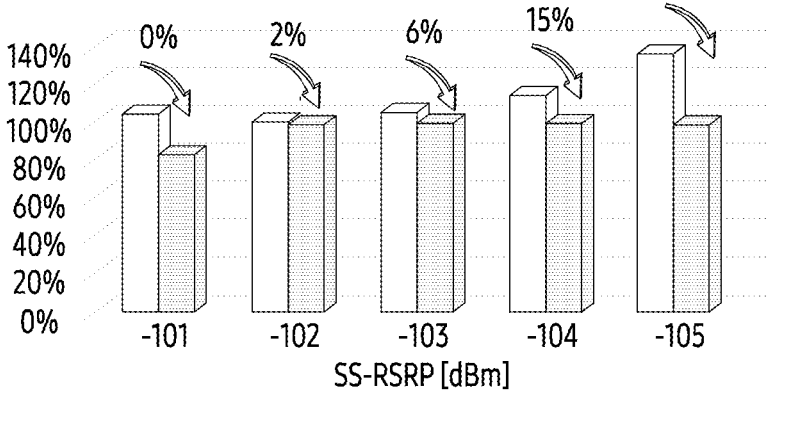
FIG. 11B is a diagram illustrating an example power saving comparison result of the second power allocation scheme according to various embodiments.

The power savings comparison results shown in FIG. 11B are based on the power allocation processing flow shown in FIG. 11A. Wherein the evaluation conditions are of the same type as the above example and will not be repeated. As can be seen by referring to FIG. 11B, the example solution can, compared to conventional algorithms, save approximately 2%-30% power.

FIG. 12 illustrates a wireless communication system according to an embodiment of the disclosure.

Referring to FIG. 12, it illustrates a base station 110 and a terminal 120 as parts of nodes using a wireless channel in a wireless communication system. Although FIG. 12 illustrates only one base station, the wireless communication system may further include another base station that is the same as or similar to the base station 110.

The base station 110 is a network infrastructure that provides wireless access to the terminal 120. The base station 110 may have a coverage defined based on a distance capable of transmitting a signal. In addition to the term 'base station', the base station 110 may be referred to as 'access point (AP), 'eNodeB (eNB)', '5th generation node', 'next generation nodeB (gNB)', 'wireless point', 'transmission/reception', or other terms having the same or equivalent meaning thereto.

The terminal 120, which is a device used by a user, performs communications with the base station 110 through a wireless channel. A link from the base station 110 to the terminal 120 is referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and another terminals (device-to-device link, D2D) is referred to as a side link, and the side link may be used mixed with a PC5 interface.

In some other embodiments of the disclosure, the terminal 120 may be operated without any user's involvement. According to an embodiment of the disclosure, the terminal 120 is a device that performs machine-type communication (MTC) and may not be carried by a user. In addition, according to an embodiment of the disclosure, the terminal 120 may be a narrowband (NB)-Internet of things (IoT) device.

The terminal 120 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 110 and the terminal 120 may perform beamforming. In this context, the beamforming may include transmission beamforming and reception beamforming. The base station 110 and the terminal 120 may assign directionality to a transmission signal or a reception signal. To that end, the base station 110 and the terminal 120 may select serving beams through a beam search or beam management procedure. After the serving beams are selected, subsequent communication may be performed through a resource having a QCL relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 1, both the base station 110 and the terminal 120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is quasi-co-located (QCL), or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G)), and the cell coverage of a base station decreased, the number of base stations to cover a certain area has increased. Thus, it led to more increased burden of initial installation costs for communication providers to install more base stations. In order to minimize the installation costs of the base station, a structure has been proposed in which the DU and the RU of the base station are separated so that one or more RUs are connected to one DU through a wired network and one or more RUs geographically distributed are arranged to cover a specific area. Hereinafter, deployment structures and extension examples of base stations according to various embodiments of the disclosure will be described with reference to FIGS. 2A to 2B.

FIG. 13 illustrates a fronthaul interface according to an embodiment of the disclosure.

A fronthaul refers to entities between a wireless LAN and a base station, as opposed to a backhaul between a base station and a core network.

Although FIG. 13 illustrate an example of a fronthaul structure between the DU 210 and one RU 220, it is only for convenience of description and the disclosure is not limited thereto. In other words, an embodiment of the disclosure may also be applied to a fronthaul structure between one DU and a plurality of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 13, the base station 110 may include a DU 210 and an RU 220. The fronthaul 215 between the DU 210 and the RU 220 may be operated through an $F_x$ interface. For the operation of the fronthaul 215, an interface, such as e.g., an enhanced common public radio interface (eCPRI) or a radio over ethernet (ROE) may be used.

Along with development of communication technology, the mobile data traffic has increased a great deal, and thus, the bandwidth requirement demanded by the fronthaul between the digital unit (DU) and the radio unit (RU) has increased significantly. In a deployment, such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of a wireless network. For example, the DU 210 may perform a function of a MAC layer and a part of the PHY layer. Here, the part of the PHY layer is performed at a higher level amongst the functions of the PHY layer, and may include, for example, channel encoding (or channel decoding), scrambling (or descrambling), modulation (or demodulation), or layer mapping (or layer de-mapping). According to an embodiment of the disclosure, when the DU 210 conforms to the O-RAN standard, it may be referred to as an O-DU (O-RAN DU).

The DU 210 may be represented replaced by a first network entity for a base station (e.g., gNB) in embodiments of the disclosure, as occasion demands.

The RU 220 may be responsible for lower layer functions of the wireless network. For example, the RU 220 may perform a part of the PHY layer and the RF function. Here, the part of the PHY layer is performed at a relatively lower level than the DU 210 amongst functions of the PHY layer, and may include, for example, iFFT transform (or FFT transform), CP insertion (CP removal), and digital beamforming. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment of the disclosure, when the RU 220 conforms to the O-RAN standard, it may be referred to as an O-RU (O-RAN RU). The RU 220 may be represented replaced by a second network entity for a base station (e.g., gNB) in embodiments of the disclosure, as circumstance demands.

Although FIG. 13 describes that the base station 110 includes the DU 210 and the RU 220, the embodiments of the disclosure are not limited thereto. The base station according to embodiments of the disclosure may be implemented with a distributed deployment according to a centralized unit (CU) configured to perform a function of upper layers (e.g., packet data convergence protocol (PDCP), radio resource control (RRC)) of an access network, and a distributed unit (DU) configured to perform a function of a lower layer. In this occasion, the distributed unit (DU) may include a digital unit (DU) and a radio unit (RU) of FIG. 12. Between the core (e.g., 5G core (5GC) or next generation core (NGC)) network and the radio network (RAN), the deployment of the base station may be implemented in the order of CU, DU, and RU. The interface between the CU and the distributed unit (DU) may be referred to as an F1 interface.

The centralized unit (CU) may be connected to one or more DUs to act as a higher layer than the DU. For example, the CU may be responsible for the functions of radio resource control (RRC) and packet data convergence protocol (PDCP) layers, and the DU and the RU may be responsible for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the distributed unit (DU) according to implementation of a distributed arrangement of the base station. Hereinafter, unless otherwise defined, the operations of the digital unit (DU) and the RU will be described, but it is to be noted that various embodiments of the disclosure may be applied to both a base station deployment including the CU or a deployment in which the DU is directly connected to a core network, that is, being incorporated into a base station (e.g., an NG-RAN node) where the CU and the DU are one entity.

FIG. 14A illustrates a functional configuration of a distributed unit (DU) according to an embodiment of the disclosure.

The configuration illustrated in FIG. 14A may be understood as a configuration of the DU 210 of FIG. 13 as a part of the base station. As used herein, the terms '~ module', '~ unit', or '~ part' mean a unit for processing at least one function or operation, which may be implemented by hardware, software, or a combination of hardware and software.

Referring to FIG. 14A, the DU 210 includes a transceiver 310, a memory 320, and a processor 330.

The transceiver 310 may perform functions for transmitting and/or receiving signals in a wired communication environment. The transceiver 310 may include a wired interface for controlling a direct connection between a device and another device through a transmission medium (e.g., copper wire, optical fiber, etc.). For example, the transceiver 310 may transmit an electrical signal to other device through a copper wire or perform a conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a system. For example, upon data transmission, the transceiver 310 generates complex symbols by encoding and modulating a transmit bit string. Further, upon data reception, the transceiver 310 restores the received bit string through demodulation and decoding of the baseband signal. Further, the transceiver 310 may include a plurality of transmission/reception paths. Furthermore, according to an embodiment of the disclosure, the transceiver 310 may be connected to a core network or connected to other nodes (e.g., integrated access backhaul (IAB).

The transceiver 310 is configured to transmit and receive signals. For example, the transceiver 310 may transmit a management plane (M-plane) message. For example, the transceiver 310 may transmit a synchronization plane (S-plane) message. For example, the transceiver 310 may transmit a control plane (C-plane) message. For example, the transceiver 310 may transmit a user plane (U-plane) message. For example, the transceiver 310 may receive the user plane message. Although only the transceiver 310 is illustrated in FIG. 14A, the DU 210 may include two or more transceivers, according to another embodiment.

The transceiver 310 transmits and receives signals as described above. Accordingly, all or at least part of the transceiver 310 may be also referred to as a communication unit, a transmission unit, a reception unit, or a transmission/reception unit. Further, throughout the description, it is to be noted that transmission and reception performed via a wireless channel are intended to include the aforementioned processing performed by the transceiver 310.

Although not shown in FIG. 14A, the transceiver 310 may further include a backhaul transceiver for connection with a core network or another base station. The backhaul transceiver provides an interface for performing communication with other nodes in the network. In other words, the backhaul transceiver converts a bit string transmitted from a base station to another node, for example, another access node, another base station, a higher node, a core network or the like, into a physical signal and converts the physical signal received from the other node into a bit string.

The memory 320 stores data, such as a basic program, an application program, and setting information for an overall operation of the DU 210. The memory 320 may be referred to as a storage unit. The memory 320 may be configured of a volatile memory, a nonvolatile memory, or a combination of a volatile memory and a nonvolatile memory. Further, the memory 320 provides stored data according to a request of the processor 330.

The processor 330 controls the overall operations of the DU 210. The processor 380 may be referred to as a controller. For example, the processor 330 transmits and receives signals through the transceiver 310 (or via a backhaul communication unit). Further, the processor 330 records and reads data into/from the memory 320. Further, the processor 330 may perform functions of a protocol stack required by the communication standard. Although only the processor 330 is illustrated in FIG. 14A, the DU 210 may include two or more processors, according to an example of another implementation.

The configuration of the DU 210 illustrated in FIG. 14A is only of an example, and a configuration of the DU performing the embodiments of the disclosure is not limited to the configuration illustrated in FIG. 14A. In some embodiments of the disclosure, some of the configuration may be added, deleted, or changed.

FIG. 14B illustrates a functional configuration of a radio unit (RU) according to an embodiment of the disclosure.

The configuration illustrated in FIG. 14B may be understood as a configuration of the RU 220 of FIG. 13, as a part of the base station. As used herein, the terms, such as '~ module', '~ unit', or '~ part' mean a unit for processing at least one function or operation, which may be implemented by hardware, software, or a combination of hardware and software.

Referring to FIG. 14B, the RU 220 includes an RF transceiver 360, a fronthaul transceiver 365, a memory 370, and a processor 380.

The RF transceiver 360 performs the functions for transmitting and receiving signals through a wireless channel. For example, the RF transceiver 360 up-converts a baseband signal into an RF band signal to transmit the RF band signal through an antenna, and down-converts the RF band signal received through the antenna into the baseband signal. For example, the RF transceiver 360 may include a transmission filter, a reception filter, an amplifier, a mixer, an oscillator, a DAC, an ADC, or the like.

The RF transceiver 360 may include a plurality of transmission/reception paths. Furthermore, the RF transceiver 360 may include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). Here, the digital circuit and the analog circuit may be implemented in a single package. Further, the RF transceiver 360 may include a plurality of RF chains. The RF transceiver 360 may perform beamforming. The RF transceiver 360 may apply a beamforming weight to a signal to be transmitted/received for assigning directionality according to the setting of the processor 380. According to an embodiment of the disclosure, the RF transceiver 360 may include a radio frequency (RF) block (or an RF part).

According to an embodiment of the disclosure, the RF transceiver 360 may transmit and receive the signal over a radio access network. For example, the RF transceiver 360 may transmit a downlink signal. The downlink signal may include a synchronization signal (SS), a reference signal (RS) (e.g., cell-specific reference signal (CRS), DM (demodulation)-RS), system information (e.g., MIB, SIB, RMSI (remaining system information), OSI (other information), configuration messages, control information, or downlink data. Further, for example, the RF transceiver 360 may receive an uplink signal. The uplink signal may include a random access related signal (e.g., random access preamble (RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 14B, the RU 220 may include two or more RF transceivers, according to another implementation example.

According to embodiments of the disclosure, the RF transceiver 360 may transmit RIM-RS. The RF transceiver 360 may transmit a first type of RIM-RS (e.g., RIM-RS type 1 of 3GPP) for notifying detection of far-field interference. The RF transceiver 360 may transmit a second type of RIM-RS (e.g., RIM-RS type 2 of 3GPP) for notifying presence or absence of the far-field interference.

The fronthaul transceiver 365 may transmit and receive a signal. According to an embodiment of the disclosure, the fronthaul transceiver 365 may transmit and receive the signal on a fronthaul interface. For example, the fronthaul transceiver 365 may receive a management plane (M-plane) message. For example, the fronthaul transceiver 365 may receive a synchronization plane (S-plane) message. For example, the fronthaul transceiver 365 may receive a control plane (C-plane) message. For example, the fronthaul transceiver 365 may transmit a user plane (U-plane) message. For example, the fronthaul transceiver 365 may receive the user plane message. Although only the fronthaul transceiver 365 is illustrated in FIG. 14B, the RU 220 may include two or more fronthaul transceivers, according to another implementation example.

The RF transceiver 360 and the fronthaul transceiver 365 transmit and receive signals as described above. As such, all or at least part of the RF transceiver 360 and the fronthaul transceiver 365 may be referred to as a communication unit, a transmission unit, a reception unit, or a transmission/reception unit. Further, throughout the following disclosure, transmission and reception performed through a radio channel are used to mean that the aforementioned processing is performed by the RF transceiver 360.

The memory 370 stores data, such as a basic program, an application program, and setting information for an overall operation of the RU 220. The memory 370 may be referred to as a storage unit. The memory 370 may be configured with a volatile memory, a nonvolatile memory, or a combination of a volatile memory and a nonvolatile memory. Further, the memory 370 provides stored data according to a request of the processor 380. According to an embodiment of the disclosure, the memory 370 may include a memory for storing conditions, instructions, or set values related to the SRS transmission scheme.

The processor 380 controls the overall operations of the RU 220. The processor 380 may be referred to as a controller. For example, the processor 380 transmits and receives signals through the RF transceiver 360 or the fronthaul transceiver 365. Further, the processor 380 writes and reads data into/from the memory 370. Then, the processor 380 may perform the functions of the protocol stack required by the communication standard. Although only the processor 380 is illustrated in FIG. 14B, the RU 220 may include two or more processors, according to another implementation example. The processor 380 may include a storage space for storing instructions/codes that are at least temporarily residing in the processor 380, as the instructions/codes being an instruction set or code stored in the memory 370. The processor 380 may further include various communication modules for performing communication. The processor 380 may control the RU 220 to perform operations according to the following embodiments of the disclosure.

The configuration of the RU 220 illustrated in FIG. 14B is only of an example, and the example of the RU performing the embodiments of the disclosure is not limited to the configuration illustrated in FIG. 14B. In some configurations, some of the configuration may be added, deleted, or changed.

Although components of the DU-RU are shown and described as being separated, implementation examples are not limited thereto. As an implementation example of the present disclosure, of course, one device including a DU and an RU may perform operations of a base station.

Based on the above example embodiments, the intelligent power allocation method provided by an embodiment facilitates significant UE power savings at the same uplink transmission rate.

Also provided in various embodiments is a method performed by a UE in a communication system, the method including:

reporting a power headroom report PHR to the base station so that the base station determines a target power allocation ratio for each carrier of the UE, and determining the transmit power respectively corresponding to each carrier according to the target power allocation ratio.

Similarly, the method of each embodiment corresponds to the method of each embodiment of the base station side, and its detailed functional description and the resulting beneficial effects can be referred to the description in the corresponding method shown in each embodiment of the base station side in the preceding paragraphs, which will not be repeated here.

An embodiment provides a base station, which may include: a power allocation ratio determination module and a power determination module, wherein, the power allocation ratio determination module is used to determine a target power allocation ratio for each carrier;

the power determination module is used to determine a transmit power respectively corresponding to each carrier according to the target power allocation ratio.

In an embodiment, the power allocation ratio determination module, when used to determine the target power allocation ratio for each carrier, is specifically used to:

determine a carrier transmission capacity respectively corresponding to the at least one candidate power allocation ratio for each carrier; and determine a target power allocation ratio from among the at least one candidate power allocation ratio according to the carrier transmission capacity respectively corresponding to the at least one candidate power allocation ratio.

In an embodiment, the power allocation ratio determination module, when used to determine the carrier transmission capacity corresponding to any of the candidate power allocation ratios of each carrier, is specifically used to:

determine an estimated transmission capacity parameter of each carrier corresponding to any of the candidate power allocation ratios and/or the resource block allocated for each carrier corresponding to any of the candidate power allocation ratios; and determine, according to the estimated transmission capacity parameters and/or the resource block, the carrier transmission capacity corresponding to any of the candidate power allocation ratios.

In an implementation, the power allocation ratio determination module, when used to determine the estimated transmission capacity parameter of each carrier corresponding to any of the candidate power allocation ratios, is specifically used to:

determine an estimated transmission capacity parameter of each carrier corresponding to any of the candidate power allocation ratios according to the historical transmission capacity parameters of each carrier.

In an implementation, the power allocation ratio determination module, when used to determine the estimated transmission capacity parameter of each carrier corresponding to any of the candidate power allocation ratios according to the historical transmission capacity parameters of each carrier, is specifically used to:

determine a compensation amount for a predetermined estimated transmission capacity parameter of each carrier corresponding to any of the candidate power allocation ratios; and determine the estimated transmission capacity parameter of each carrier corresponding to any of the candidate power allocation ratios according to the historical transmission capacity parameter of each carrier and the compensation amount.

In an implementation, the power allocation ratio determination module, when used to determine the compensation amount for the predetermined estimated transmission capacity parameter of each carrier corresponding to any of the candidate power allocation ratios, is specifically used to:

determine the compensation amount for the predetermined estimated transmission capacity parameter of each carrier corresponding to any of the candidate power allocation ratios according to at least one of a transmit power of each carrier corresponding to any of the candidate power allocation ratios, transmission loss of each carrier, and a predetermined adjustment factor.

In an embodiment, the estimated transmission capacity parameter includes at least one of the followings:

estimated number of symbols, estimated signal values, estimated interference values, estimated signal to interference plus noise ratio (SINR), estimated modulation and coding scheme (MCS), and estimated number of layers.

In an implementation, the power allocation ratio determination module, when used to determine the resource block to be allocated for each carrier corresponding to any of the candidate power allocation ratios, is specifically used to:

determine the resource block allocated for each carrier corresponding to any of the candidate power allocation ratios according to the transmit power of each carrier corresponding to any of the candidate power allocation ratios and the resource block parameters corresponding to each carrier;

wherein the resource block parameters include at least one of the following: a power headroom report, a power demand for the resource block, and a power allocation boundary for carrier aggregation.

In an implementation, the power allocation ratio determination module, when used to determine the carrier transmission capacity respectively corresponding to the at least one candidate power allocation ratio for each carrier, is specifically used to:

determine the transmission capacity of each carrier respectively corresponding to the at least one candidate power allocation ratio; and determine, according to the transmission capacity of each carrier respectively corresponding to the at least one candidate power allocation ratio, the total carrier transmission capacity respectively corresponding to the at least one candidate power allocation ratio.

The power allocation ratio determination module, when used to determine a target power allocation ratio from among the at least one candidate power allocation ratios according to the carrier transmission capacity respectively corresponding to the at least one candidate power allocation ratios, may be used to:

determine the candidate power allocation ratio corresponding to the maximum total carrier transmission capacity in the at least one candidate power allocation ratio as the target power allocation ratio.

In an implementation, the power allocation ratio determination module, when used to determine the total carrier transmission capacity respectively corresponding to the at least one candidate power allocation ratio according to the transmission capacity of each carrier respectively corresponding to the at least one candidate power allocation ratio, may be used to:

iteratively determine, according to the transmission capacity of each carrier corresponding to the at least one candidate power allocation ratio, a maximum total carrier transmission capacity in the total carrier transmission capacities corresponding to the at least one candidate power allocation ratio until an end-of-iteration condition is satisfied to obtain a candidate power allocation ratio corresponding to the maximum total carrier transmission capacity among the at least one candidate power allocation ratio.

In an embodiment, the power allocation ratio determination module, when used to determine the target power allocation ratio for each carrier, may be used to:

determine an estimated control plane power of a primary carrier; and determine a target power allocation ratio for each carrier according to the estimated control plane power.

In an embodiment, the power allocation ratio determination module, when used to determine the estimated control plane power of the primary carrier, may be used to:

determine the estimated control plane power of the primary carrier according to the historical control plane power of the primary carrier.

In an embodiment, the power allocation ratio determination module, when used to determine a target power allocation ratio for each carrier based on the estimated control plane power, may be used to:

when determining the target power allocation ratio for each carrier, determine the power allocation ratio for the primary carrier to be not smaller than the ratio of the estimated control plane power to the total power based on the estimated control plane power.

In an embodiment, the power determination module, when used to determine the transmit power respectively corresponding to each carrier according to the target power allocation ratio, may be used to:

compare the first total carrier transmission capacity corresponding to the target power allocation ratio with the second total carrier transmission capacity corresponding to the historical power allocation method; and if the first total carrier transmission capacity is greater than the second total carrier transmission capacity, determine the transmit power respectively corresponding to each carrier according to the target power allocation ratio.

Embodiments provide a UE, which may include a transmitting module for reporting a power headroom report PHR to the base station so that the base station determines a target power allocation ratio for each carrier of the UE and, according to the target power allocation ratio, determines a transmit power respectively corresponding to each carrier.

The user equipment and the base station of various embodiments can perform the method provided in the various embodiments with similar implementation principles. The actions performed by the modules in the user equipment and the base station of various embodiments are corresponding to the operations in the method of various embodiments. The detailed functional descriptions of the modules of the user equipment and the base station and the resulting beneficial effects may be referred to the descriptions in the corresponding methods shown in the preceding paragraphs, which will not be repeated here.

According to embodiments, a device of a base station in a communication system supporting a carrier aggregation (CA). The device comprises at least one transceiver and at least one processor coupled to the at least one transceiver. The at least one processor is configured to identify ratio information for a plurality of carriers for a user equipment (UE) from at least one candidate ratio information based on a total carrier transmission capacity of the plurality of carriers. The at least one processor is configured to determine a transmit power for each carrier based on the target power allocation ratio information. The at least one processor is configured to obtain, from the UE, uplink signals according to the transmit power for each carrier. The ratio information for the plurality of carriers includes a power allocation ratio for each carrier. The total carrier transmission capacity of the plurality of carriers comprises transport block sizes of individual carriers in the plurality of carriers (e.g., a sum of transport block sizes of individual carriers in the plurality of carriers).

In an embodiment, the at least one processor is, to identify the ratio information, configured to obtain total carrier transmission capacities of the plurality of carriers based on each candidate ratio information of the at least one candidate ratio information. The at least one processor is, to identify the ratio information, configured to identify the ratio information, which provides a maximum total carrier transmission capacity of the total carrier transmission capacity of the total carrier transmission capacities, from the at least one candidate ratio information.

In an embodiment, the transport block sizes include a transport block size of a corresponding carrier. The transport block size is determined based on at least one capacity parameter for the corresponding carrier, and resource block (RB) allocation information for the corresponding carrier.

In an embodiment, wherein the at least one capacity parameter comprises at least one of the number of symbols, a modulation and coding scheme (MCS), the number of layers, a waveform, or a maximum modulation mode.

In an embodiment, the MCS is determined based on an estimated signal to interference plus noise ratio (SINR) and an offset according to a power allocation ratio of the corresponding carrier according to one of at least one candidate ratio information.

In an embodiment, the device comprises of a distributed unit (DU) of the base station, the uplink signals are obtained from the UE through a radio unit (RU) of the base station.

In an embodiment, the RB allocation information is determined based on a maximum transmit power; and a power allocation ratio of the corresponding carrier according to one of at least one candidate ratio information.

In an embodiment, wherein the RB allocation information is further determined based on a power limit for the corresponding carrier, information of a power headroom (PH) for the corresponding carrier, and a power demand for the corresponding carrier.

In an embodiment, the at least one processor is further configured to obtain, from the UE, a power headroom report (PHR) based a PHR reporting period. The information of the PH for the corresponding carrier is updated based on the PHR.

In an embodiment, the plurality of carriers comprises a primary carrier for a primary cell (PCell) and at least one second carrier for a secondary cell (SCell). For one of at least one candidate ratio information, a sum of power allocation ratios of individual carriers is one and a power allocation ratio of the primary carrier is greater than a minimum threshold.

In an embodiment, the minimum threshold is determined based on an estimated control plane power associated with the primary carrier and a total power.

According to embodiments, a method performed by a base station in a communication system supporting a carrier aggregation (CA). The method comprises identifying ratio information for a plurality of carriers for a user equipment (UE) from at least one candidate ratio information based on a total carrier transmission capacity of the plurality of carriers. The method comprises determining a transmit power for each carrier based on the target power allocation ratio information. The method comprises receiving, from the UE, uplink signals according to the transmit power for each carrier. The ratio information for the plurality of carriers includes a power allocation ratio for each carrier. The total carrier transmission capacity of the plurality of carriers comprises transport block sizes of individual carriers in the plurality of carriers (e.g., a sum of transport block sizes of individual carriers in the plurality of carriers).

In an embodiment, the identifying of the ratio information comprises obtaining total carrier transmission capacities of the plurality of carriers based on each candidate ratio information of the at least one candidate ratio information, The identifying of the ratio information comprises identifying the ratio information, which provides a maximum total carrier transmission capacity of the total carrier transmission capacities, from the at least one candidate ratio information.

In an embodiment, the transport block sizes include a transport block size of a corresponding carrier. The transport block size is determined based on at least one capacity parameter for the corresponding carrier and resource block (RB) allocation information for the corresponding carrier.

In an embodiment, the at least one capacity parameter comprises at least one of the number of symbols, a modulation and coding scheme (MCS), the number of layers, a waveform, or a maximum modulation mode.

In an embodiment, the MCS is determined based on an estimated signal to interference plus noise ratio (SINR) and an offset according to a power allocation ratio of the corresponding carrier according to one of at least one candidate ratio information.

In an embodiment, the RB allocation information is determined based on a maximum transmit power; and a power allocation ratio of the corresponding carrier according to one of at least one candidate ratio information.

In an embodiment, wherein the RB allocation information is further determined based on a power limit for the corresponding carrier, information of a power headroom (PH) for the corresponding carrier, and a power demand for the corresponding carrier.

In an embodiment, the method further comprises receiving, from the UE, a power headroom report (PHR) based a PHR reporting period. The information of the PH for the corresponding carrier is updated based on the PHR.

In an embodiment, the plurality of carriers comprises a primary carrier for a primary cell (PCell) and at least one second carrier for a secondary cell (SCell). For one of at least one candidate ratio information, a sum of power allocation ratios of individual carriers is one and a power allocation ratio of the primary carrier is greater than a minimum threshold. The minimum threshold is determined based on an estimated control plane power associated with the primary carrier and a total power.

According to embodiments, a non-transitory computer-readable storage medium having stored thereon program instructions, the instructions, when executed by a processor, perform operations including identifying ratio information for a plurality of carriers for a user equipment (UE) from at least one candidate ratio information based on a total carrier transmission capacity of the plurality of carriers. The operations includes determining a transmit power for each carrier based on the target power allocation ratio information. The operations includes receiving, from the UE, uplink signals according to the transmit power for each carrier. The ratio information for the plurality of carriers includes a power allocation ratio for each carrier. The total carrier transmission capacity of the plurality of carriers comprises a sum of transport block sizes of individual carriers in the plurality of carriers (e.g., a sum of transport block sizes of individual carriers in the plurality of carriers).

According to embodiments, a method performed by a base station in a communication system including a plurality of carriers, comprises determining a target power allocation ratio for each carrier and determining, according to the target power allocation ratio, a transmit power respectively corresponding to each carrier.

In an embodiment, the determining a target power allocation ratio for each carrier, comprises determining a carrier transmission capacity respectively corresponding to at least one candidate power allocation ratio for each carrier and determining, according to the carrier transmission capacity respectively corresponding to the at least one candidate power allocation ratio, the target power allocation ratio from among the at least one candidate power allocation ratio.

In an embodiment, the determining the carrier transmission capacity corresponding to any of the candidate power allocation ratios for each carrier, comprises: determining an estimated transmission capacity parameter of each carrier corresponding to the any of the candidate power allocation ratios and/or a resource block allocated for each carrier corresponding to the any of the candidate power allocation ratios; and determining, according to the estimated transmission capacity parameter and/or the resource block, the carrier transmission capacity corresponding to the any of the candidate power allocation ratios.

In an embodiment, the determining the estimated transmission capacity parameter of each carrier corresponding to the any of the candidate power allocation ratios, comprises: determining, according to a historical transmission capacity parameter of each carrier, the estimated transmission capacity parameter of each carrier corresponding to the any of the candidate power allocation ratios.

In an embodiment, the determining, according to a historical transmission capacity parameter of each carrier, the estimated transmission capacity parameter of each carrier corresponding to the any of the candidate power allocation ratios, comprises determining a compensation amount for a specified estimated transmission capacity parameter of each carrier corresponding to the any of the candidate power allocation ratios; and determining, according to the historical transmission capacity parameter of each carrier and the compensation amount, the estimated transmission capacity parameter of each carrier corresponding to the any of the candidate power allocation ratios.

In an embodiment, the determining a compensation amount for a predetermined estimated transmission capacity parameter of each carrier corresponding to the any of the candidate power allocation ratios, comprises determining, according to at least one of the transmit power of each carrier corresponding to the any of the candidate power allocation ratios, transmission loss of each carrier, and a specified adjustment factor, the compensation amount for the specified estimated transmission capacity parameter of each carrier corresponding to the any of the candidate power allocation ratios.

In an embodiment, the estimated transmission capacity parameter comprises at least one of an estimated number of symbols, estimated signal values, estimated interference values, estimated signal to interference plus noise ratio (SINR), estimated modulation and coding scheme (MCS), and estimated number of layers.

In an embodiment, the determining the resource block allocated for each carrier corresponding to the any of the candidate power allocation ratios, comprises determining, according to the transmit power of each carrier corresponding to the any of the candidate power allocation ratios and the resource block parameters corresponding to each carrier, the resource block allocated for each carrier corresponding to the any of the candidate power allocation ratios. The resource block parameters comprise at least one of: a power headroom report, a power demand for the resource block, and a power allocation boundary for carrier aggregation.

In an embodiment, the determining a carrier transmission capacity respectively corresponding to at least one candidate power allocation ratio for each carrier, comprises determining the transmission capacity of each carrier respectively corresponding to the at least one candidate power allocation ratio, and determining, according to the transmission capacity of each carrier respectively corresponding to the at least one candidate power allocation ratio, a total carrier transmission capacity respectively corresponding to the at least one candidate power allocation ratio for each carrier. The determining, according to the carrier transmission capacity respectively corresponding to the at least one candidate power allocation ratio, the target power allocation ratio from among the at least one candidate power allocation ratio, comprises determining the candidate power allocation ratio corresponding to a maximum total carrier transmission capacity in the at least one candidate power allocation ratio as the target power allocation ratio.

In an embodiment, the determining, according to the transmission capacity of each carrier respectively corresponding to the at least one candidate power allocation ratio, a total carrier transmission capacity respectively corresponding to the at least one candidate power allocation ratio for each carrier, comprises iteratively determining, according to the transmission capacity of each carrier corresponding to the at least one candidate power allocation ratio, the maximum total carrier transmission capacity in the total carrier transmission capacities corresponding to the at least one candidate power allocation ratio, until an end-of-iteration condition is satisfied to obtain a candidate power allocation ratio corresponding to the maximum total carrier transmission capacity in the at least one candidate power allocation ratio.

In an embodiment, the determining a target power allocation ratio for each carrier, comprises determining an estimated control plane power for a primary carrier; and determining the target power allocation ratio for each carrier based on the estimated control plane power.

In an embodiment, the determining an estimated control plane power for a primary carrier, comprise determining the estimated control plane power for the primary carrier according to a historical control plane power for the primary carrier.

In an embodiment, the determining the target power allocation ratio for each carrier based on the estimated control plane power, comprises based on determining the target power allocation ratio for each carrier, determining, based on the estimated control plane power, the power allocation ratio for the primary carrier to be not less than a ratio of the estimated control plane power to a total power.

In an embodiment, the determining, according to the target power allocation ratio, the transmit power respectively corresponding to each carrier, comprises comparing a first total carrier transmission capacity corresponding to the target power allocation ratio with a second total carrier transmission capacity corresponding to a historical power allocation method; and based on the first total carrier transmission capacity being greater than the second total carrier transmission capacity, determining, according to the target power allocation ratio, the transmit power respectively corresponding to each carrier.

According to embodiments, a method performed by a user equipment (UE) in a communication system comprising a plurality of carriers, comprises reporting a power headroom report (PHR) to a base station for the base station to determine a target power allocation ratio for each carrier of the UE, and determining a transmit power respectively corresponding to each carrier according to the target power allocation ratio.

According to embodiments, a base station, comprises a transceiver configured to transmit and receive signals; and a controller coupled to the transceiver and configured to perform one of the methods.

According to embodiments, a user equipment, comprises a transceiver configured to transmit and receive signals; and a controller coupled to the transceiver and configured to perform one of the methods.

According to embodiments, a non-transitory computer-readable storage medium having stored thereon program instructions, the instructions, when executed by a processor, perform one of the methods.

The UE or base station provided by an embodiment may implement at least one of the plurality of modules using an AI model. The functions associated with the AI may be performed using a non-volatile memory, a volatile memory, and a processor.

The processor may include one or more processors. In this case, the one or more processors may be a general purpose processor, such as a central processing unit (CPU), an application processor (AP), etc., or a pure graphics processing unit, e.g., a graphics processing unit (GPU), a visual processing unit (VPU), and/or an AI-specific processor, such as a neural processing unit (NPU).

The one or more processors control the processing of the input data according to predefined operational rules or artificial intelligence (AI) models stored in non-volatile memory and volatile memory. The predefined operation rules or AI models are provided by training or learning.

Providing by learning may refer to obtaining predefined operating rules or AI models with desired characteristics by applying a learning algorithm to a plurality of learned data. The learning may be performed in the device itself in which the AI according to an embodiment is executed, and/or may be implemented by a separate server/system.

The AI model may include a plurality of neural network layers. Each layer has a plurality of weight values, and the calculation of a layer is performed by the results of the calculation of the previous layer and the plurality of weights of the current layer. Examples of neural networks include, but are not limited to, convolutional neural networks (CNNs), deep neural networks (DNNs), recurrent neural networks (RNNs), restricted Boltzmann machines (RBMs), deep belief networks (DBNs), bidirectional recurrent deep neural networks (BRDNNs), generative adversarial networks (GANs), and deep Q networks.

A learning algorithm is a method of training a predetermined target device (e.g., a robot) using multiple learning data to enable, allow, or control the target device to make determinations or predictions. Examples of the learning algorithm include, but are not limited to, supervised learning, unsupervised learning, semi-supervised learning, or reinforcement learning.

Provided in various embodiments is an electronic device including: a transceiver configured to transmit and receive signals; and a controller coupled to the transceiver and configured to perform the operations of each of the preceding embodiments. The electronic device may be a UE, and the processor in the electronic device is configured to perform control to implement the operations provided by the UE as described in the preceding embodiments. The electronic device may be a base station, and the processor in the electronic device is configured to perform control to implement the operations of the base station as provided in the preceding embodiments.

In an embodiment an electronic device is provided, the electronic device may include: a processor and a memory. Wherein, the processor and the memory are connected, such as via a bus. The electronic device may further include a transceiver, which may be used for data interaction between the electronic device and other electronic devices, such as the transmitting of data and/or the receiving of data, etc. It should be noted that the transceiver is not limited to one in practical applications and the structure of the electronic device and is not a limitation of the various embodiments.

The processor can be a Central Processing Unit (CPU), a general-purpose processor, a Digital Signal Processor (DSP), an Application Specific Integrated Circuit (ASIC), a Field Programmable Gate Array (FPGA), or other programmable logic device, transistorized logic device, hardware component, or any combination thereof. It may implement or perform various example logic blocks, modules, and circuits described in conjunction with the disclosure of the present application. The processor may also be a combination that implements a computing function, such as a combination containing one or more microprocessors, and a combination of a DSP and a microprocessor, etc.

The bus may include a pathway to transfer information between the above components. The bus can be a Peripheral Component Interconnect (PCI) bus or an Extended Industry Standard Architecture (EISA) bus, etc. The bus can be divided into address bus, data bus, and control bus, etc.

The memory can be a Read Only Memory (ROM) or other types of static storage devices that can store static information and instructions, a Random Access Memory (RAM) or other types of dynamic storage devices that can store information and instructions, or an Electrically Erasable Programmable Read Only Memory (EEPROM), a Compact Disc Read Only Memory (CD-ROM) or other optical disc storage, optical disc storage (including compressed disc, laser disc, optical disc, digital universal optical disc, and Blu-ray disc, etc.), disk storage media, other magnetic storage devices, or any other media capable of being used to carry or store computer programs and capable of being read by a computer, which is not limited herein.

The memory is used to store computer programs that execute embodiments of the present application and is controlled by a processor for execution. The processor is used to execute the computer programs stored in the memory to implement the operations shown in the preceding method embodiment.

The electronic device includes, but is not limited to: a terminal device such as a fixed terminal and/or a mobile terminal, for example, the UE may be a cell phone, a tablet computer, a laptop computer, a wearable device, a game console, a desktop computer, an all-in-one computer, an in-vehicle terminal, a robot, and the like, without limitation.

In the method performed in the electronic device in an embodiment, the method for estimating, reasoning, or predicting the target power allocation ratio for each carrier may be performed using an artificial intelligence model by inputting corresponding parameter data. The processor of the electronic device may perform pre-processing operations on the data to convert it into a form suitable for use as input to the artificial intelligence model. The artificial intelligence model can be obtained through training. Here, "obtained by training" may refer to the basic artificial intelligence model being trained by a training algorithm with a plurality pieces of training data to obtain predefined operational rules or artificial intelligence models configured to perform the desired feature (or purpose). The artificial intelligence model may include multiple neural network layers. Each layer of the plurality of neural network layers includes a plurality of weight values and performs neural network computations by the calculation between the results of the previous layer and the plurality of weight values.

Estimation, inference, or prediction are techniques for logical reasoning and prediction by determining information, including, for example, knowledge-based reasoning, optimization prediction, preference-based planning, or recommendation, but not limited thereto.

An embodiment provides a non-transitory computer-readable storage medium having computer programs stored on the computer readable storage medium, the computer programs being executable by a processor to implement the operations and corresponding contents of the preceding method embodiments.

An embodiment also provides a computer program product including computer programs, the computer programs, when executed by a processor, implement the operations and corresponding contents of the preceding method embodiments.

The terms "first", "second", "1", "2", etc. in the disclosure are used to distinguish similar objects and not necessarily used to describe a particular order or sequence. It should be understood that the data so used is interchangeable where appropriate so that an embodiment described herein can be implemented in an order other than that illustrated or described in the text.

It should be understood that while the flow diagrams of an embodiment indicate the individual operations by arrows, the order in which these operations are performed is not limited to the order indicated by the arrows. Unless explicitly stated herein, in some implementation scenarios of an embodiment, the operations in the respective flowcharts may be performed in other orders as desired. In addition, some or all of the operations in each flowchart may include multiple sub-operations or multiple stages according to actual implementation scenarios. Some or all of these sub-operations or phases may be executed at the same moment, and each of these sub-operations or phases may also be executed separately at different moments. In the scenario where the execution moment is different, the execution order of these sub-operations or stages can be flexibly configured according to the demand, which is not limited in an embodiment.

While the disclosure has been illustrated and described with reference to various example embodiments, it will be understood that the various embodiments are intended to be illustrative, not limiting. It will be further understood by one skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. A base station supporting a carrier aggregation (CA), the base station comprising:

at least one transceiver;

memory, including one or more storage media, storing instructions; and at least one processor comprising processor circuitry coupled to the at least one transceiver, wherein the instructions, when executed by the at least one processor individually and/or collectively, cause the base station to:

identify transport block sizes (TBSs) based on candidate power allocation ratios for a plurality of carriers of the CA, identify a power allocation ratio corresponding to a maximum TBS of the TBSs, from among the candidate power allocation ratios;

determine transmit powers for the plurality of carriers based on the target-power allocation ratio;

transmit, to a user equipment (UE), control information indicating the transmit powers for the plurality of carriers; and receive, from the UE, uplink signals according to the transmit powers for the plurality of carriers.

2. The device of claim 1, wherein the TBSs include a TBS of a corresponding carrier of the plurality of carriers, and wherein the TBS is determined based on:

at least one capacity parameter for the corresponding carrier, and resource block (RB) allocation information for the corresponding carrier.

3. The device of claim 2, wherein the at least one capacity parameter comprises at least one of:

the number of symbols, a modulation and coding scheme (MCS), the number of layers, a waveform, or a maximum modulation mode, and wherein the MCS is determined based on an estimated signal to interference plus noise ratio (SINR) and an offset according to a power allocation ratio of the corresponding carrier.

4. The device of claim 2, wherein the base station comprises a distributed unit (DU), and wherein the uplink signals are obtained from the UE through a radio unit (RU).

5. The device of claim 2, wherein the RB allocation information is determined based on:

a maximum transmit power; and a power allocation ratio of the corresponding carrier.

6. The device of claim 5, wherein the RB allocation information is further determined based on a power limit for the corresponding carrier, information of a power headroom (PH) for the corresponding carrier, and a power demand for the corresponding carrier-.

7. The device of claim 6, wherein the instructions, when executed by the at least one processor, individually and/or collectively, cause the base station to:

obtain, from the UE, a power headroom report (PHR) based on a PHR reporting period, wherein the information of the PH for the corresponding carrier is updated based on the PHR.

8. The device of claim 2, wherein the plurality of carriers comprises a primary carrier for a primary cell (PCell) and at least one secondary carrier for a secondary cell (SCell), and wherein a power allocation ratio of the primary carrier is greater than a minimum threshold.

9. The device of claim 8, wherein the minimum threshold is determined based on an estimated control plane power associated with the primary carrier and a total power.

10. A method performed by a base station supporting a carrier aggregation (CA), the method comprising:

identifying transport block sizes (TBSs) based on candidate power allocation ratios for a plurality of carriers of the CA;

identifying a power allocation ratio corresponding to a maximum TBS of the TBSs, from at least one candidate ratio information based on a total carrier transmission capacity of the plurality of carriers determining transmit powers for the plurality of carriers based on the power allocation ratio;

transmitting, to a user equipment (UE), control information indicating the transmit powers for the plurality of carers; and receiving, from the UE, uplink signals according to the transmit powers for each the plurality of carriers.

11. The method of claim 10, wherein the TBSs include a TBS of a corresponding carrier of the plurality of carriers, wherein the TBS is determined based on:

at least one capacity parameter for the corresponding carrier, and resource block (RB) allocation information for the corresponding carrier.

12. The method of claim 11, wherein the at least one capacity parameter comprises at least one of:

the number of symbols, a modulation and coding scheme (MCS), the number of layers, a waveform, or a maximum modulation mode.

13. The method of claim 11, wherein the MCS is determined based on an estimated signal to interference plus noise ratio (SINR) and an offset according to a power allocation ratio of the corresponding carrier.

14. The method of claim 11, wherein the RB allocation information is determined based on:

a maximum transmit power; and a power allocation ratio of the corresponding carrier.

15. The method of claim 14, wherein the RB allocation information is further determined based on a power limit for the corresponding carrier, information of a power headroom (PH) for the corresponding carrier, and a power demand for the corresponding carrier.

16. The method of claim 15, further comprising:

receiving, from the UE, a power headroom report (PHR) based a PHR reporting period, wherein the information of the PH for the corresponding carrier is updated based on the PHR.

17. The method of claim 11, wherein the plurality of carriers comprises a primary carrier for a primary cell (PCell) and at least one second carrier for a secondary cell (SCell), wherein a power allocation ratio of the primary carrier is greater than a minimum threshold, and wherein the minimum threshold is determined based on an estimated control plane power associated with the primary carrier and a total power.

18. A non-transitory computer-readable storage medium having stored thereon program instructions, the instructions, when executed by a processor, perform operations including:

identifying transport block sizes (TBSs) based on candidate power allocation ratios for a plurality of carriers of a carrier aggregation (CA);

identifying a power allocation ratio corresponding to a maximum TBS of the TBSs, from among the candidate power allocation ratios;

determining transmit powers for the plurality of carriers based on the power allocation ratio;

transmitting, to a user equipment (UE), control information indicating the transmit powers for the plurality of carriers; and receiving, from the UE, uplink signals according to the transmit powers for the plurality of carriers.

* * * * *